(12) United States Patent
Morita et al.

(10) Patent No.: US 7,430,595 B2
(45) Date of Patent: Sep. 30, 2008

(54) INFORMATION PROCESSING APPARATUS AND METHOD, INFORMATION PROCESSING SYSTEM USING THE SAME, AND RECORDING MEDIUM AND PROGRAM USED THEREWITH

(75) Inventors: Toshihiro Morita, Kanagawa (JP); Takayuki Kori, Kanagawa (JP)

(73) Assignee: Sony Corporation, Tokyo (JP)

( * ) Notice: Subject to any disclaimer, the term of this patent is extended or adjusted under 35 U.S.C. 154(b) by 1222 days.

(21) Appl. No.: 10/123,998

(22) Filed: Apr. 17, 2002

(65) Prior Publication Data

US 2002/0194355 A1 Dec. 19, 2002

(30) Foreign Application Priority Data

Apr. 19, 2001 (JP) ............................. 2001-120802

(51) Int. Cl.
G06F 15/173 (2006.01)
(52) U.S. Cl. ...................... 709/223; 709/203; 709/217; 709/231; 725/131
(58) Field of Classification Search ................ 709/203, 709/217, 219, 223, 225, 229, 231; 725/131
See application file for complete search history.

(56) References Cited

U.S. PATENT DOCUMENTS

| 5,892,825 | A  | * | 4/1999  | Mages et al. ................. 705/51 |
| 6,209,132 | B1 |   | 3/2001  | Harrison et al. |
| 6,248,946 | B1 | * | 6/2001  | Dwek ......................... 84/609 |
| 6,408,332 | B1 | * | 6/2002  | Matsumoto et al. ........ 709/219 |
| 6,477,548 | B1 | * | 11/2002 | Nihei ......................... 707/204 |
| 6,496,802 | B1 | * | 12/2002 | van Zoest et al. ........... 705/14 |
| 6,570,080 | B1 | * | 5/2003  | Hasegawa et al. ........... 84/609 |
| 6,675,179 | B2 | * | 1/2004  | Morohashi .................. 709/219 |
| 6,691,149 | B1 | * | 2/2004  | Yokota et al. ............... 709/201 |
| 6,807,641 | B1 | * | 10/2004 | Ishiguro et al. ............... 714/6 |
| 6,815,601 | B2 | * | 11/2004 | Yano ............................ 84/655 |
| 6,834,348 | B1 | * | 12/2004 | Tagawa et al. .............. 713/193 |
| 6,868,403 | B1 | * | 3/2005  | Wiser et al. .................. 705/51 |
| 6,889,211 | B1 | * | 5/2005  | Yoshiura et al. ............. 705/58 |
| 6,949,704 | B2 | * | 9/2005  | Funaki ........................ 84/609 |
| 7,124,444 | B2 | * | 10/2006 | Yang .......................... 726/26 |
| 7,222,183 | B2 | * | 5/2007  | Juszkiewicz ................ 709/231 |
| 7,266,202 | B1 | * | 9/2007  | Kawakami et al. .......... 380/283 |

(Continued)

FOREIGN PATENT DOCUMENTS

EP          1 081 575           3/2001

(Continued)

*Primary Examiner*—Lashonda T Jacobs
(74) *Attorney, Agent, or Firm*—Oblon, Spivak, McClelland, Maier & Neustadt, P.C.

(57) ABSTRACT

An information processing apparatus includes a music file storage unit and a transport processor. The music file storage unit stores a music file, PC-use additional information that can be displayed by a personal computer, and PD-use additional information that can be displayed by a portable device as they are. At the time of move-out, the transport processor copies, to the portable device, the music file, the PC-use additional information, and the PD-use additional information that are stored in the music file storage unit. When the data is correctly written in the portable device, the transport processor deletes, from the music file storage unit, the music file, the PC-use additional information, and the PD-use additional information.

14 Claims, 25 Drawing Sheets

U.S. PATENT DOCUMENTS

| | | | |
|---|---|---|---|
| 7,287,167 B2 * | 10/2007 | Sako et al. | 713/193 |
| 7,307,934 B1 * | 12/2007 | Miyazaki | 369/53.31 |
| 7,350,238 B2 * | 3/2008 | Abe et al. | 713/193 |
| 7,362,870 B2 * | 4/2008 | Okaue | 380/281 |
| 2002/0156705 A1 * | 10/2002 | Koyata et al. | 705/27 |
| 2006/0164678 A1 * | 7/2006 | Choi et al. | 358/1.15 |

FOREIGN PATENT DOCUMENTS

| | | |
|---|---|---|
| WO | WO 00 08909 | 2/2000 |
| WO | WO 00 58962 | 10/2000 |
| WO | WO 00 79406 | 12/2000 |

* cited by examiner

FIG. 5

| ID | MUSIC NAME | ARTIST NAME | MUSIC FILE STORAGE PLACE | PD-USE ADDITIONAL-INFORMATION STORAGE PLACE | PC-USE ADDITIONAL-INFORMATION STORAGE PLACE | PC-EDITING ADDITIONAL-INFORMATION STORAGE PLACE |
|---|---|---|---|---|---|---|
| 1 | Song-A | 4 hero | C:¥Root¥Song-A¥track.omg | C:¥Root¥Song-A¥msainf.msf | C:¥Root¥Song-A¥PKG00001 | C:¥Root¥Song-A¥PKG00001-edit |
| 2 | Song-B | 4 hero | C:¥Root¥Song-B¥track.omg | C:¥Root¥Song-B¥msainf.msf | C:¥Root¥Song-B¥PKG00001 | C:¥Root¥Song-B¥PKG00001-edit |
| 3 | Song-C | Unknown | C:¥Root¥Song-C¥track.omg | C:¥Root¥Song-C¥msainf.msf | C:¥Root¥Song-C¥PKG00001 | C:¥Root¥Song-C¥PKG00001-edit |

FIG. 13

| 121 | 122 | 123 |

PROPERTY OF MUSIC

- MUSIC INFORMATION
- ADDITIONAL INFORMATION
- FILE INFORMATION

TITLE (T): TWO FOR WALK

ARTIST NAME (A): ∗∗∗ JAZZ ORCHESTRA

GENRE NAME (G): track_jazz

ALBUM/TRACK: SamplePkg 20010131_2

PLAY TIME: 0021

DATE AND TIME OF RECORDING: 2001/03/21 15:29:59

COPYRIGHT INFORMATION: COPYRIGHT-FREE

— CONDITIONS FOR USE —

PLAYBACK LIMITATION: NONE

NUMBER OF TIMES CHECKOUT IS PERFORMED: 3

[DETAILS (D)]

[OTHER INFORMATION (O)]

[OK] [CANCEL] [HELP]

INFORMATION PROCESSING APPARATUS AND METHOD, INFORMATION PROCESSING SYSTEM USING THE SAME, AND RECORDING MEDIUM AND PROGRAM USED THEREWITH

BACKGROUND OF THE INVENTION

1. Field of the Invention

The present invention relates to information processing apparatuses and methods, information processing systems using the same, and recording media and programs used therewith, and in particular, to an information processing apparatus and method, an information processing system, a recording medium, and a program that are intended to prevent a data loss due to shifting of content.

2. Description of the Related Art

Recently, as digital technology comes into widespread use, various types of data, such as music data and picture data, have become digitally recorded or played back.

In order to protect copyright, there is a case in which, based on right information corresponding to data, the number of times the data is played back, or a period in which the data can be used, etc., is limited.

In addition, a user can purchase various types of data, such as music data and picture data, from a terminal unit or the like which is provided at a store, and can use the data after recording it in a personal computer of the user. Based on corresponding right information, the purchased data is permitted to be shifted without limiting the number of times or only once. After the shifting is performed, only a transfer of the data to the personal computer or a portable device is permitted.

The purchased data (hereinafter referred to as "content") includes various types of additional information. The additional information includes, for example, character strings such as a title and an artist name, an image of a jacket cover, lyrics, and a video clip.

These pieces of the additional information tend to be gradually extended in accordance with an intention of a content providing manufacturer or with version upgrade of an application in a personal computer which records and manages content.

Accordingly, it is preferable that the additional information of the content stored in the personal computer or the like be described in a highly extensible format.

However, portable devices that are inferior in processing ability to personal computers have a problem in that the highly extensible format is not practical because it takes a lot of time to read additional information described in the highly extensible format.

Accordingly, it is possible that the additional information be described in a simple format, but its extensibility is low in the personal computer.

In general, when additional information stored in a personal computer is transferred to a portable device with content, the additional information, which is described in extensible format, is transferred after being converted into a simple format that can be read and written by the portable device.

Nevertheless, when the additional information described in simple format, which is transferred to the portable device, is further transferred to another personal computer, a problem occurs in that part of the additional information is insufficient because the portable device cannot convert the additional information described in simple format into information in extensible format.

SUMMARY OF THE INVENTION

The present invention is made in view of such circumstances. It is an object of the present invention to enable additional information of content to be transferred without losing data.

To this end, according to an aspect of the present invention, a first information processing apparatus for distributing content is provided. The first information processing apparatus includes a generating unit for generating first additional information displayable by a first electronic device and second additional information displayable by a second electronic device in which the first additional information and the second additional information concern the content, and a distribution control unit for controlling the distribution of the first additional information and the second additional information generated by the generating unit as well as the content.

Preferably, the first additional information is information described in a highly extensible format, and the second additional information is information described in a simple format.

According to another aspect of the present invention, a first information processing method for an information processing apparatus for distributing content is provided. The first information processing method includes a generating processing step for generating first additional information displayable by a first electronic device and second additional information displayable by a second electronic device in which the first additional information and the second additional information concern the content, and a distribution-control-processing step for controlling the distribution of the first additional information and the second additional information generated by the generating unit as well as the content.

According to another aspect of the present invention, a first computer-readable recording medium containing a program for controlling an information processing apparatus for distributing content is provided. The program includes a generating processing step for generating first additional information displayable by a first electronic device and second additional information displayable by a second electronic device in which the first additional information and the second additional information concern the content, and a distribution-control-processing step for controlling the distribution of the first additional information and the second additional information generated by the generating unit as well as the content.

According to another aspect of the present invention, a first program for controlling a computer which controls an information processing apparatus for distributing content to execute a process is provided. The process includes a generating processing step for generating first additional information displayable by a first electronic device and second additional information displayable by a second electronic device in which the first additional information and the second additional information concern the content, and a distribution-control-processing step for controlling the distribution of the first additional information and the second additional information generated by the generating unit as well as the content.

According to another aspect of the present invention, a second information processing apparatus is provided which includes an acquisition unit which acquires content, first additional information on the content, and second additional information on the content, a recording unit in which the content, the first additional information, and the second additional information which are acquired by the acquisition unit are recorded, and a transfer control unit which, when the content is directed to move by a user's operation, controls transfer to another information processing apparatus of the content, the first additional information, and the second additional information which are recorded in the recording unit.

Preferably, one of the first additional information and the second additional information is information described in a highly extensible format which can be displayed by the information processing apparatus, and the other one is information described in a simple format which can be displayed by the other information processing apparatus.

The second information processing apparatus may further include a display-control unit which controls displaying of the first additional information recorded in the recording unit.

According to another aspect of the present invention, a second information processing method is provided which includes an acquisition-control-processing step which controls acquisition of content, first additional information on the content, and second additional information on the content, a recording-control-processing step which controls recording of the content, the first additional information, and the second additional information which are acquired by the acquisition-control-processing step, and a transfer-control-processing step which, when the content is directed to move by a user's operation, controls transfer to the other information processing apparatus of the content, the first additional information, and the second additional information in which the recording thereof is controlled by the processing of the recording-control-processing step.

According to another aspect of the present invention, a second computer-readable recording medium containing a program is provided. The program includes an acquisition-control-processing step which controls acquisition of content, first additional information on the content, and second additional information on the content, a recording-control-processing step which controls recording of the content, the first additional information, and the second additional information which are acquired by the acquisition-control-processing step, and a transfer-control-processing step which, when the content is directed to move by a user's operation, controls transfer to the other information processing apparatus of the content, the first additional information, and the second additional information in which the recording thereof is controlled by the processing of the recording-control-processing step.

According to another aspect of the present invention, a second program for controlling a computer to execute a process is provided. The process includes an acquisition-control-processing step which controls acquisition of content, first additional information on the content, and second additional information on the content, a recording-control-processing step which controls recording of the content, the first additional information, and the second additional information which are acquired by the acquisition-control-processing step, and a transfer-control-processing step which, when the content is directed to move by a user's operation, controls transfer to the other information processing apparatus of the content, the first additional information, and the second additional information in which the recording thereof is controlled by the processing of the recording-control-processing step.

According to another aspect of the present invention, an information processing system is provided which includes a first information processing apparatus for distributing content, a second information processing apparatus for acquiring the content, and a third information processing apparatus for acquiring the content. The first information processing apparatus includes a generating unit for generating first additional information displayable by the second information processing apparatus, and second additional information displayable by the third information processing apparatus in which the first additional information and the second additional information concern the content, and a distribution-control unit for controlling the distribution of the first additional information and the second additional information generated by the generating unit as well as the content. The second information processing apparatus includes a first acquisition unit for acquiring the content, the first additional information, and the second additional information which are distributed from the first information processing apparatus, a first recording unit in which the content, the first additional information, and the second additional information which are acquired by the first acquisition unit are recorded, and a transfer-control unit which, when the content is directed to move by a user's operation, controls transfer to the third information processing apparatus of the content, the first additional information, and the second additional information which are recorded in the first recording unit. The third information processing apparatus includes a second acquisition unit for acquiring the content, the first additional information, and the second additional information which are transferred from one of the first and second information processing apparatus, and a second recording unit in which the content, the first additional information, and the second additional information which are acquired by the second acquisition unit are recorded.

Preferably, the second information processing apparatus further includes display-control unit which controls displaying of the first additional information acquired by the first acquisition unit.

The third information processing apparatus may further include a display-control unit which controls displaying of the second additional information acquired by the second acquisition unit.

According to a first information processing apparatus, method, and program of the present invention, by generating first additional information displayable by a first electronic device, and second additional information displayable by a second electronic device in which they concern content, and controlling distribution of the generated first and second additional information as well as the content, the additional information of the content can be transferred without losing data.

According to a second information processing apparatus, method, and program of the present invention, content, first additional information on the content, and second additional information on the content are acquired and recorded, and when the content is directed to move by a user's operation, transfer to another information processing apparatus of the recorded content, first additional information, and second additional information is controlled, whereby the additional information of the content can be transferred without losing data.

In addition, according to an information processing system of the present invention, a first information processing apparatus generates first additional information on content which is displayable by a second information processing apparatus, and second additional information on the content which is displayable by a third information processing apparatus, and controls distribution of the generated first and second additional information as well as the content. The content, and first and second additional information that are distributed from the first information processing apparatus are acquired and recorded in a second information processing apparatus, and when the content is directed to move by a user's operation, the second information processing apparatus controls the distribution to a third information processing apparatus of the recorded content, and first and second additional information, and the content, and first and second additional information that are transferred are acquired and recorded in the third information processing apparatus. Therefore, the additional information of the content can be transferred without losing data.

BRIEF DESCRIPTION OF THE DRAWINGS

FIG. 5 is an illustration of an example of data that a database records;
FIG. 13 is an illustration of a property screen.

DESCRIPTION OF THE PREFERRED EMBODIMENTS

Embodiments of the present invention are described below with reference to the accompanying drawings.

Figure 1:
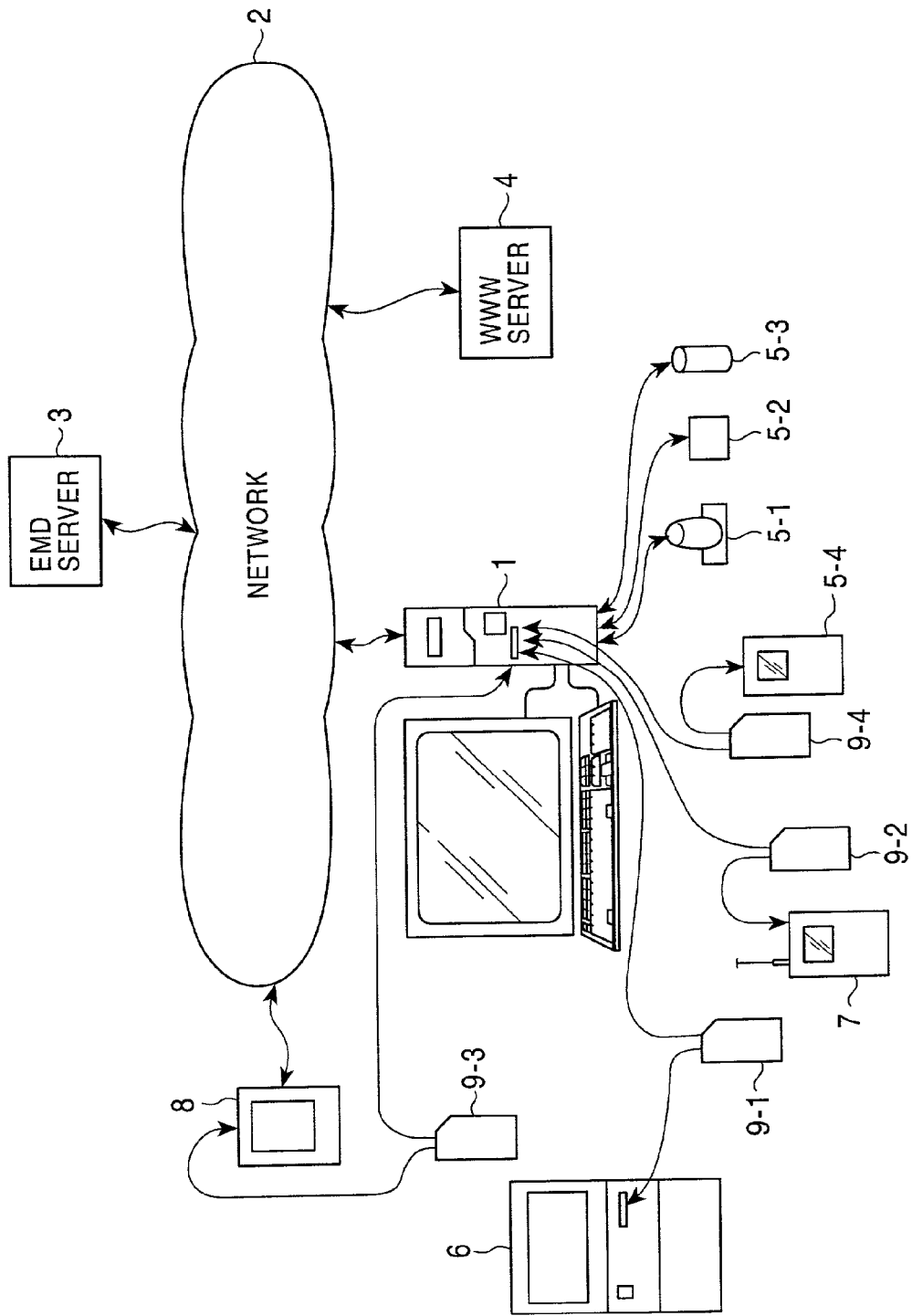
FIG. 1 is a block diagram of an embodiment of a content-data management system according to the present invention.

FIG. 1 is a block diagram showing a content-data management system according to an embodiment of the present invention. A personal computer 1 is connected to a network 2 including a local area network or the Internet. In the personal computer 1, audio data (hereinafter referred to as "content") that is received from an electronic music distribution (EMD) server 3 or is read from a compact disk (CD) is directly recorded, or is converted into a portable device coding format (e.g., Adaptive Transform Acoustic Coding 3 (ATRAC3) (trademark)) and encrypted in an encryption system such as Data Encryption Standard (DES) before being recorded.

The personal computer 1 records the data of right-information representing conditions for using content, in the form of plaintext or in accordance with the recorded content in encrypted form.

The data of right information represents, for example, the number of portable devices (hereinafter referred to also as "PDs") (the so-called "number of PDs" that can perform check-out described below) that can simultaneously use content corresponding to the data of right information. Even when pieces of content are transferred to the number of portable devices which is represented by the right information, the personal computer 1 can play back the content.

Here, "check-out" means, for example, to copy, to any one (hereinafter referred to as a "portable device 5") of portable devices 5-1 to 5-3, the content and data relating to the content among the content, the data relating to the content, and the data of right information on the content which are recorded in the personal computer 1, and "check-in" means to return the content that has been checked out from the personal computer 1 to the personal computer 1. After check-out is performed, the content and the content-related data recorded in the portable device 5 are erased.

Alternatively, the data of right information indicates that content can be copied. When copying content to the portable devices 5-1 to 5-3, the personal computer 1 can play back the recorded content. There may be a case in which the number of times the content can be stored in the portable devices 5-1 to 5-3 is limited. In this case, the number of times the content can be copied does not increase.

Alternatively, the data of right information indicates that the content can be copied without limiting the number of times (i.e., no conditions for use are indicated). When copying the content to the portable devices 5-1 to 5-3, the personal computer 1 can play back the recorded content.

Alternatively, the data of right information indicates that it is possible to shift (hereinafter referred to as "move" if necessary) the content to another personal computer. After performing shifting (hereinafter referred to as "move-out" if necessary) of the content to the portable devices 5-1 to 5-3, the content recorded in the personal computer 1 cannot be used (the content is deleted, or cannot be used due to a change in the right information).

Here, "move-out" means, for example, to shift, to the portable devices 5, all of the content, data relating to the content, and right information on the content, differently from the above check-out, and "move-in" means to shift, to the personal computer 1, all of content, data relating to the content, and right information on the content.

Also, the right information indicates that, after content is transferred to the personal computer 1, only check-in or check-out is permitted. This permission to shift content only once is defined as "import". Check-out to, for example, the portable devices 5-1 to 5-3 of content imported from the memory cards 9-1 to 9-4 to the personal computer 1 is permitted, but shifting thereof to the another personal computer or the memory cards 9-1 to 9-4 is not permitted.

The personal computer 1 stores the recorded, encrypted content in the portable device 5-1 connected thereto, with data (e.g., a music name, or playback conditions, etc.) relating to the content by using a universal serial bus (USB) cable, and performs updating (hereinafter referred to as "check-out") of the data of right information corresponding to the stored content in accordance with the storing to the portable device 5-1. For details, when the personal computer 1 performs check-out, the number of times the data of right information corresponding to the content recorded in the personal computer 1 can be checked out is reduced by one. When the number of times the check-out can be performed is zero, the corresponding content cannot be checked out.

Similarly, the personal computer 1 stores the recorded, encrypted content in the portable device 5-2 or 5-3 connected thereto, with the data relating to the content by using the USB cable, and updates the data of right information corresponding to the stored content in accordance with the storing to the portable device 5-2 or 5-3.

The personal computer 1 uses the USB cable to control the connected portable device 5-1 to erase (or to disable) the content checked out to the portable device 5-1 by the personal computer 1, and updates (hereinafter referred to as "checks in") the data of right information corresponding to the erased content. For details, when the check-in is performed, the number of times data can be checked out which is recorded in the personal computer 1 and which is described in the right information on the corresponding content is increased by one.

Similarly, the personal computer 1 uses the USB cable to control the portable device 5-2 or 5-3 to erase (or disable) the content checked out to the portable device 5-2 or 5-3 by the personal computer 1, and erases the data of right information corresponding to the erased content.

The personal computer 1 cannot check in content that is checked out to the portable device 5-1 by another personal computer, which is not shown. Similarly, the personal computer 1 cannot check in content that is checked out to the portable device 5-2 or 5-3 by the other personal computer. In other words, a device that can check in is uniquely determined.

In response to a request from the personal computer 1, the EMD server 3 supplies content to the personal computer 1 via the network 2 with data (e.g., a music name, or playback limitation, etc.) relating to the content and right information. The EMD server 3 supplies only additional information to the personal computer 1 via the network 2 in response to a request from the personal computer 1.

The content supplied by the EMD server 3 has been coded by a predetermined coding system and has been encrypted by a predetermined encryption system. The EMD server 3 supplies the personal computer 1 with a key for decrypting the content.

In response to a request from the personal computer 1, a World Wide Web (WWW) server 4 uses the network 2 to supply data (e.g., a CD album name, or a CD sales company, etc.) corresponding to a CD in which its content has been read, and data (e.g., a music name or a composer name, etc.) corresponding to the content read from the CD to the personal computer 1. The WWW server 4 also uses the network 2 to supply only additional information to the personal computer 1 in response to the personal computer 1.

The portable device 5-1 stores the content (i.e., content checked out or moved out) supplied from the personal computer 1 with data (e.g., a music name, or right information, etc.) relating to the content. Based on the data relating to the content, the portable device 5-1 plays back and outputs the stored content to headphones (not shown), etc.

By way of example, when the content is played back beyond the number of times playback is performed which is described in the right information and which is stored as the data relating to the content, the portable device 5-1 ends playback of the corresponding content. Also, for example, when the content is played back after a playback deadline described in the right information and which is stored as the data relating to the right information, the portable device 5-1 ends playback of the corresponding content.

The user can dismount the content-storing portable device 5-1 from the personal computer 1, can carry it with the user, and can listen with the headphones to music or the like corresponding to the content while playing back the stored content.

Similarly to the portable device 5-1, the portable device 5-2 or 5-3 stores the content supplied from the personal computer 1, together with the data relating to the content. Based on the data relating to the content, the portable device 5-2 or 5-3 plays back and outputs the stored content to headphones, which are not shown. The user can dismount the content-storing portable device 5-2 or 5-3 from the personal computer 1, can carry it with the user, and can listen with the headphones to music or the like corresponding to the content while playing back the stored content.

The memory card 9-1 is inserted into the terminal unit 6 provided at the store, and stores content that is purchased by operating the terminal unit 6 by the user, together with data such as corresponding right information and additional information. In other words, the terminal unit 6 receives content and data including content-related right information and additional information which are distributed from the EMD server 3, and stores them in the inserted memory card 9-1. Based on the data of the right information, import (i.e., only-once shift) of predetermined content stored in the memory card 9-1 is permitted.

A memory card 9-1 storing content is loaded in a slot of the personal computer 1. The personal computer 1 imports (moves in) the content stored in the memory card 9-1. The personal computer 1 generates the data of right information permitting only check-in or check-out, and stores the generated data of right information. Based on the right information, the content imported to the personal computer 1 is permitted to be checked out to the portable devices 5-1 to 5-3 or is permitted to be checked in from the portable devices 5-1 to 5-3.

A memory card 9-2 is inserted into a mobile phone 7, and stores content (e.g., content downloaded via a mobile phone link) that is purchased by operating the mobile phone 7 by the user, together with the data of corresponding right information. Predetermined content stored in the memory card 9-2 is permitted based on the data of right information to be imported.

The memory card 9-2 storing content is loaded into the slot of the personal computer 1. The personal computer 1 imports the content stored in the loaded memory card 9-2. The personal computer 1 generates the data of right information which corresponds to the imported content and which permits only check-in or check-out, and stores the generated data of right information.

A memory card 9-3 is inserted into a personal digital assistant (PDA) 8, and stores, in response to an operation of the PDA 8 by the user, for example, content purchased from the EMD server 3 via the network 2 with the data of corresponding right information. Predetermined content stored in the memory card 9-3 is permitted based on the data of right information to be imported.

The memory card 9-3 storing the content is loaded into the slot of the personal computer 1. The personal computer 1 imports the content stored in the loaded memory card 9-3. The personal computer 1 generates the data of right information which corresponds to the imported content and which permits only check-out or check-in, and stores the generated data of right information.

A memory card 9-4 is inserted into a recording portable device 5-4 (hereinafter referred to as a portable device 5-4 if necessary), and stores content that is recorded in audio form by operating the portable device 5-4 by the user, with the data of generated corresponding right information. The content stored in the memory card is permitted based on the data of the right information to be imported.

The memory card 9-4 storing the content is loaded in the slot of the personal computer 1. The personal computer 1 imports the content stored in the loaded memory card 9-4. The personal computer 1 generates the data of right information which corresponds to the imported content and which permits only check-out or check-in, and stores the generated data of right information.

When the portable devices 5-1 to 5-4 do not hereinafter need to be separately distinguished, they are referred to simply as the portable devices 5. When the memory cards 9-1 to 9-4 do not hereinafter need to be separately distinguished, they are referred to simply as the memory cards 9.

Figure 2:
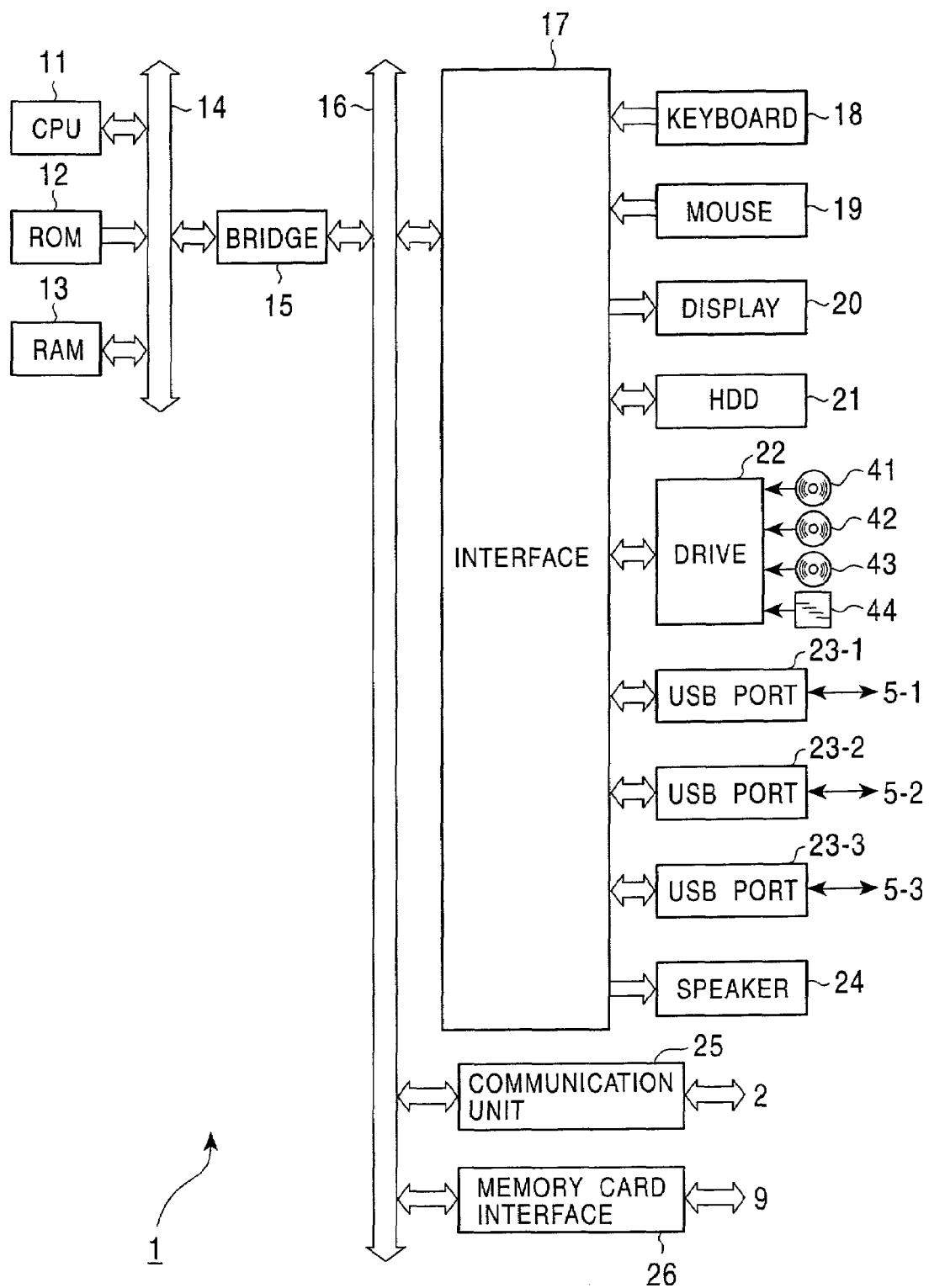
FIG. 2 is a block diagram showing the internal structure of the personal computer shown in FIG. 1.

FIG. 2 is a block diagram showing the structure of the personal computer 1.

A central processing unit (CPU) 11 actually executes various application programs (e.g., an application program which is a so-called jukebox) for implementing functions described later and an OS (Operating System). In general, a read-only memory (ROM) 12 basically stores fixed data among programs and arithmetic parameters which are used by the CPU 11. A random access memory (RAM) 13 stores a program executed by the CPU 11, and parameters that necessarily vary with the execution. The CPU 11 to the RAM 13 are connected to one another by a host bus 14 including a CPU bus.

The host bus 14 is connected by a bridge 15 to an external bus 16 such as a peripheral component interconnect/interface (PCI) bus.

A keyboard 18 is used by the user when the user inputs various commands to the CPU 11. A mouse 19 is operated by the user when the user designates or selects points on the screen of a display 20. A display 20 is made of a liquid crystal display (LCD) or a cathode-ray tube (CRT), etc., and displays various types of information in text and in image. A hard disk drive (HDD) 21 drives a hard disk, and records or plays back a program or information that the CPU 11 executes.

A drive 22 reads data or a program recorded on a magnetic disk 41, an optical disk 42 (including a CD), a magneto-optical disk 43, or a semiconductor memory 44 which is loaded, and supplies the data or program to the connected RAM 13 via the interface 17, the external bus 16, the bridge 15, and the host bus 14.

The portable device 5-1 is connected to a USB port 23-1 via a USB cable. The USB port 23-1 outputs, to the portable device 5-1, data (including, for example, content or a command to the portable device 5-1) supplied from the CPU 11, the RAM 13, or the HDD 21 via the host bus 14, the bridge 15, the external bus 16, and the interface 17, and uses the interface 17 to the host bus 14 to supply the HDD 21, the CPU 11, or the RAM 13 with data stored in the portable device 5-1.

The portable device 5-2 is connected to a USB port 23-2 by a USB cable, and the portable device 5-3 is connected to a USB port 23-3 by a USB cable. Similarly to the USB port 23-1, the USB port 23-2 or 23-3 outputs, to the portable device 5-2 or 5-3, data (including, for example, content or a command to the portable device 5-2 or 5-3) supplied from the CPU 11, the RAM 13, or the HDD 21, and supplies the HDD 21, the CPU 11, or the RAM 13 with data stored in the portable device 5-2 or 5-3.

A speaker 24 outputs, based on an audio signal output from the interface 17, predetermined sound corresponding to content.

The keyboard 18 to the speaker 24 are connected to the interface 17, and the interface 17 is connected to the CPU 11 by the external bus 17, the bridge 15, and the host bus 14.

The-network 2 is connected to a communication unit 25. It uses the network 2 to transmit data (e.g., a content transmission request, etc.) supplied from the CPU 11 or the HDD 21 after storing the data in packets in accordance with a predetermined system, and uses the network 2 to output the data (e.g., content, etc.) stored in the received packets to the CPU 11, the RAM 13, or the HDD 21.

A memory interface card 26 reads, from the memory card 9 loaded in the slot of the personal computer 1, the content stored in the memory card 9 and the data of the corresponding right information, and supplies them to the CPU 11, the RAM 13, or the HDD 21, while it stores the data supplied from the CPU 11, the RAM 13, or the HDD 21 in the memory card 9.

The communication unit 25 and the memory card interface 26 are connected to the CPU 11 by the external bus 16, the bridge 15, and the host bus 14.

When each of the USB ports 23-1 to 23-3 does not hereinafter need to be separately distinguished, it is referred to simply as the USB port 23.

Figure 3:
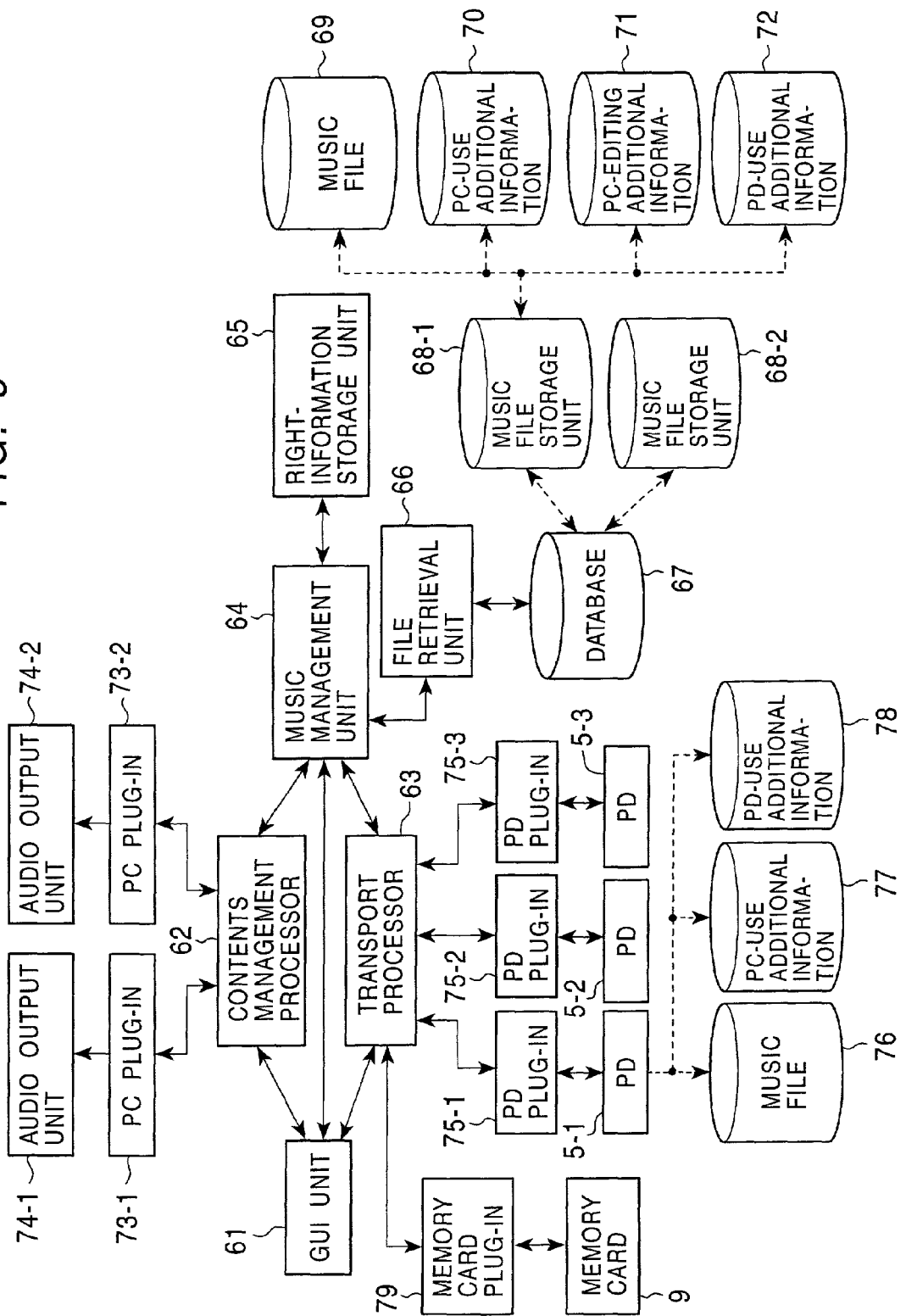
FIG. 3 is a block diagram showing the functions of the personal computer shown in FIG. 1.

FIG. 3 is a block diagram showing the functions of the personal computer 1 that are implemented such that the CPU 11 executes a content management program.

In response to an operation of the keyboard 18 or a mouse 19 by the user, a graphical user interface (GUI) unit 61 supplies a music management unit 64 with a music name corresponding to content desired by the user or a file name of a file storing content, etc., and requests it to record data corresponding to the content in a database 67.

The GUI unit 61 uses the music management unit 64 to acquire the data corresponding to the content from the database 67, for example, a music ID, a music name, or an artist name as well as data such as additional information to content, and data from a right information storage unit 65, such as a music name or right information, and displays, on the display 20, text such as the music ID, the music name, or the artist name, and an icon corresponding to the right information. The GUI unit 61 also controls the display 20 to display the additional information to the content in response to a request from the user.

When an operation of the user requests content to be played back, the GUI unit 61 supplies a content management processor 62 with a music ID corresponding to the content requested to be played back, and requests the content management processor 62 to play back the content.

When being requested by the user to perform transfer (check-out, copy, or shift, etc.) of content, the GUI unit 61 supplies the transfer processor 63 with the music ID corresponding to the content requested to be transferred, and requests the transfer processor 63 to transfer the content.

When an operation of the user requests import of content, the GUI unit 61 supplies a transfer processor 63 with a media content ID corresponding to the content requested to be imported, and requests the transfer processor 63 to perform import of the content.

The GUI unit 61 acquires, from the transfer processor 63, data corresponding to content stored in the portable devices 5-1 to 5-3 or the memory card 9, for example, data such as a media content ID, a music name, an artist name, and right information, and controls the display 20 to display text data such as the music name or the artist name, and an icon corresponding to the data of the right information.

When being requested by the GUI unit 61 to play back the content, the content management processor 62 supplies the music management unit 64 with the music ID corresponding to the content requested to be played back, and requests a file name corresponding to the content from it. When acquiring the file name from the music management unit 64, the content management processor 62 acquires the content from a music file storage unit 68-1 or 68-2 through the database 67, a file retrieval unit 66, and the music management unit 64.

The content management processor 62 supplies the acquired content to a PC (protected content) plug-in 73-1 or 73-2.

When being supplied with unencrypted content from the content management processor 62, the PC plug-in 73-1 or 73-2 decodes coded content and supplies audio data to each of audio output units 74-1 and 74-2. When being supplied with encrypted content from the content management processor 62, the PC plug-in 73-1 or 73-2 decrypts the encrypted content into plaintext, and decodes coded content and supplies audio data to each of audio output units 74-1 and 74-2. Each of the audio output units 74-1 and 74-2 generates, based on audio data, an audio signal and outputs sound from the speaker 24.

Also, when being supplied with content from the content management processor 62, the PC plug-in 73-1 or 73-2 receives an optimization file type supplied with the content, and optimizes the content. For example, data conversion processing, right information conversion processing, and processing for detecting a watermark in accordance with a predetermined system, etc., are performed as optimization of the content.

The user may install an additional PC plug-in into the personal computer 1.

When the PC plug-in 73-1 or the PC plug-in 73-2 does not hereinafter need to be separately distinguished, it is referred to simply as the PC plug-in 73.

When being requested by the GUI unit 61 to transfer content, the transport processor 63 supplies the music management unit 64 with a music ID corresponding to the content requested to be transferred, and requests the file name corresponding to the content from it. When acquiring the file name from the music management unit 64, the transport processor 63 uses the database 67, the file retrieval unit 66, and the music management unit 64 to acquire, from the music file storage unit 68-1 or 68-2, the content corresponding to the file name. The transport processor 63 supplies the acquired content to each of the PC plug-ins 75-1 to 75-3. The transport processor 63 supplies each of the PC plug-ins 75-1 to 75-3 with the data of additional information corresponding to the content if necessary.

When being requested by the GUI unit 61 to import content, the transport processor 63 supplies a memory card plug-in 79 with a media content ID corresponding to the content requested to be imported, and requests it to import the content corresponding to the media content ID. The transport processor 63 acquires, from the memory card plug-in 79, the content to be imported, with the data of corresponding right information or additional information. The transport processor 63 supplies the music management unit 64 with the content to be imported, together with the data of right information or the data of additional information.

When being requested by the GUI unit 61 to shift (move in) content to the personal computer, the transport processor 63 supplies the memory card plug-in 79 with the media content ID corresponding to the content requested to be shifted, and requests it to shift the content corresponding to the media content ID. The transport processor 63 acquires, from the memory card plug-in 79, the content to be shifted, with the data of corresponding right information or the data of additional information. The transport processor 63 supplies the music management unit 64 with the content to be shifted, with the data of right information or the data of additional information.

When transferring content to the portable device 5-1, the PC plug-in 75-1 mutually authenticates the portable device 5-1. When mutual authentication is not performed, the PC plug-in 75-1 does not transfer the content to the portable device 5-1.

When being supplied with encrypted content from the transport processor 63, the PC plug-in 75-1 supplies the portable device 5-1 with content together with data relating to the content. When being supplied with unencrypted content from the transport processor 63, the PC plug-in 75-1 encrypts content, and supplies the encrypted content and data relating to the content to the portable device 5-1.

Processing for the mutual authentication may be executed when the portable device 5-1 is connected to the personal computer 1.

Similarly to the PC plug-in 75-1, when the PC plug-in 75-2 or 75-3 transfers content to the portable device 5-2 or 5-3, it mutually authenticate the portable device 5-2 or 5-3. When mutual authentication is not performed, the PC plug-in 75-2 or 75-3 does not transfer the content to the portable device 5-2 or 5-3.

When being supplied with encrypted content from the transport processor 63, the PC plug-in 75-2 or 75-3 supplies the portable device 5-2 or 5-3 with the content and data relating to the content. When being supplied with unencrypted content from the transport processor 63, the PC plug-in 75-2 or 75-3 encrypts content and supplies the encrypted content to the portable device 5-2 or 5-3 with data relating to the content.

Processing for the mutual authentication may be executed when the portable device 5-2 or 5-3 is connected to the personal computer 1.

The user may install an additional PC plug-in in the personal computer 1.

When each of the PC plug-ins 75-1 to 75-3 does not hereinafter need to be distinguished, it is referred to simply as the PC plug-in 75.

When being requested by the transport processor 63 to import content, the memory card plug-in 79 reads content corresponding to the media content ID from the memory card 9 with the data of corresponding right information or the data of additional information. The memory card plug-in 79 supplies the transport processor 63 with the read content together with the data of right information or the data of additional information.

When being request by the transport processor 63 to shift the content, the memory card plug-in 79 reads the content corresponding to the media content ID from the memory card 9 with the data of corresponding right information or the data of additional information. The memory card plug-in 79 supplies the transport processor 63 with the data of the right information or the data of additional information.

The music management unit 64 uses the file retrieval unit 66 to store, in the database 67, data such as the music name corresponding to the content, and the file name corresponding to the content, and to read a music name or a file name from the database 67. When receiving a music name or a file name from the GUI unit 61, the music management unit 64 adds a record and records the music name or the file name as an item of the record in the database 67.

When being supplied with the data of right information or the data of additional information from the transport processor 63 with the content to be imported, the music management unit 64 uses the file retrieval unit 66 to store, in the database 67, data such as the music name corresponding to the content and the file name corresponding to the content, and to record the data of the content and the additional information in the music file storage unit 68-1 or 68-2. Based on the right information supplied for the content to be imported, the music management unit 64 generates and records new data of right information in the right-information storage unit 65. At this time, the data of right information generated by the music management unit 64 records that only check-in or check-out is permitted.

When being supplied with the data of right information or the data of additional information from the transport processor 63 together with the content to be shifted, the music management unit 64 uses the file retrieval unit 66 to store, in the database 67, the music name corresponding to the content and the file name corresponding to the content, and to store, in the music file storage unit 68-1 or 68-2, the content and the data of additional information. The music management unit 64 records, in the right-information storage unit 65, the data of right information supplied for the content to be imported.

The music management unit 64 reads all music names and music IDs recorded in the database 67 in response to a request from the GUI unit 61, and supplies them to the GUI unit 61.

When being supplied with a music ID from the content management processor 62, the music management unit 64 reads the file name corresponding to the music ID from the database 67, and supplies the read file name to the content management processor 62. When being supplied with a music ID from the transport processor 63, the music management unit 64 reads the file name corresponding to the music ID from the database 67, and supplies the read file name to the transport processor 63.

In response to a request from the music management unit 64, based on the file name acquired from the database 67, the file retrieval unit 66 retrieves, from the music file storage unit 68-1 or 68-2, a music file 69 (storing content) corresponding to the file name. The file retrieval unit 66 supplies the music management unit 64 with the music file 69 read from the music file storage unit 68-1 or 68-2, or changes the file name of the music file 69 and supplies the music management unit 64 with the music file 69 having the changed file name.

The music management unit 64 supplies the content management processor 62 or the transport processor 63 with the music file 69 in which the content is stored.

The right-information storage unit 65 stores, for example, in the HDD 21, right information corresponding to files based on a standard defined in the Secure Digital Music Initiative (SDMI), and manages the right information. When receiving a music ID from the music management unit 64, the right-information storage unit 65 retrieves a piece of the right information which corresponds to the music ID and supplies the retrieved right information to the music management unit 64.

Figure 4:
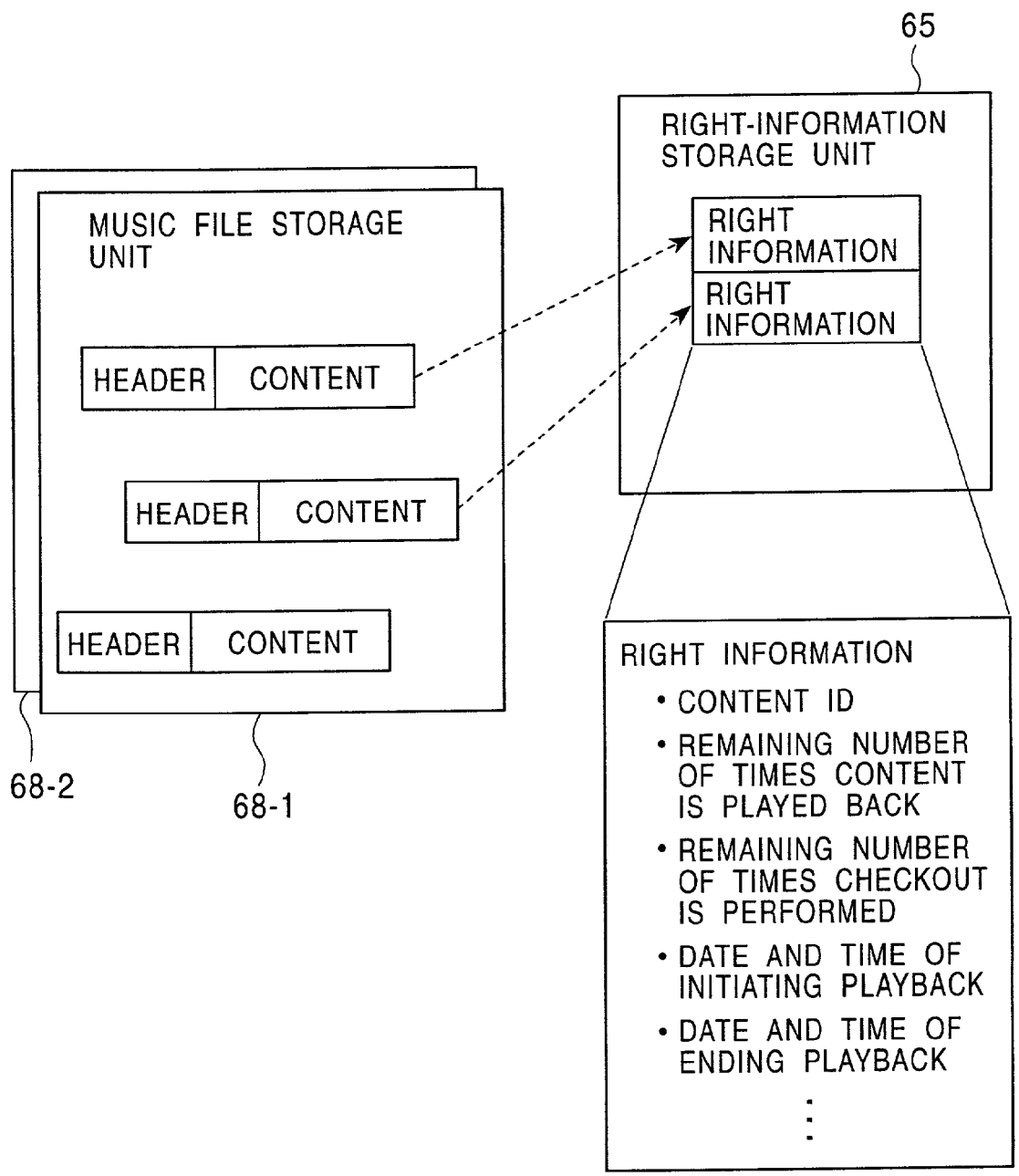
FIG. 4 is an illustration of an example of right information stored in a right-information storage unit.

FIG. 4 is an illustration of an example of right information stored in the right-information storage unit 65. As shown in FIG. 4, the right-information storage unit 65 stores, for example, content Ids, the remaining number of times content is played back, the remaining number of times check-out is performed, the date and time of initiating playback, the date and time of ending playback, etc. Pieces of right information stored in the right-information storage unit 65 corresponds to each file stored in the music file storage unit 68-1 or 68-2.

Each file stored in the music file storage unit 68-1 or 68-2 consists of, for example, a header and content as music data.

Referring back to FIG. 3, the database 67 is stored in the HDD 21, and contains data relating to content, for example, music Ids, music names, file names, other attributes, etc.

FIG. 5 is an illustration of examples of data recorded by the database 67. As shown in FIG. 5, the database 67 contains, for example, music IDs, music names, artist names, music file storage places, PD-use additional-information storage places, PC-use additional-information storage places, PC-editing additional-information storage places, etc. The values of frequently used music names and artist names which are included in the additional information may be stored in the database 67 so that they may be quickly extracted.

Each music ID uniquely corresponds to each piece of music in a recording medium of the personal computer 1, for example, the HDD 21, and is an identifier having a value unique to each piece of music. Each music name indicates the name of each piece of music. Each artist name indicates a music singer, a songwriter, or a composer.

Each music-file-name storage place is a path representing a place in which the music file 69 is stored. Each PD-use additional-information storage place is a path representing a place in which PD-use additional information 72 is stored. Each PC-use additional-information storage place is a path representing PC-use additional information 70 is stored. Each PC-editing additional-information storage place is a path representing a place in which PC-editing additional information 71 is stored.

In the case shown in FIG. 5, data is recorded in which the music ID "1" corresponds to the music name "Song-A", the artist name "4 hero", the music-file-name storage place "C:¥Root¥Song-A¥trac.omg", the PD-use additional-information storage place "C:¥Root¥Song-A¥msainf.msf", the PC-use additional-information storage place "C:¥Root¥Song-A¥PKG0001", and the PC-editing additional-information storage place "C:¥Root¥Song-A¥PKG00011-edit".

In the case shown in FIG. 5, data is recorded in which the music ID "2" corresponds to the music name "Song-B", the artist name "4 hero", the music-file-name storage place "C:¥Root¥Song-B¥trac.omg", the PD-use additional-information storage place "C:¥Root¥Song-B¥msainf.msf", the PC-use additional-information storage place "C:¥Root¥Song-B¥PKG0001", and the PC-editing additional-information storage place "C:¥Root¥Song-B¥PKG00011-edit".

In the case shown in FIG. 5, data is recorded in which the music ID "3" corresponds to the music name "Song-C", the artist name "Unkown", the music-file-name storage place "C:¥Root¥Song-C¥trac.omg", the PD-use additional-information storage place "C:¥Root¥Song-C¥msainf.msf", the PC-use additional-information storage place "C:¥Root¥Song-C¥PKG0001", and the PC-editing additional-information storage place "C:¥Root¥Song-C¥PKG00011-edit".

Referring back to FIG. 3, the music-file storage unit 68-1 is formed by, for example, the HDD 21 or an external storage unit (not shown) such as a removal disk unit, and stores files such as the music file 69, the PC-use additional information 70, the PC-editing additional information 71, the PD-use additional information 72, etc.

The music file 69 is a file including sound data (so-called content) of music. The music file 69 includes, in addition to the sound data, a header and an additional information path (information representing a place in which additional information is stored).

The PC-use additional information 70 is music-related additional information managed by the personal computer 1. Accordingly, the PC-use additional information 70 is described in a highly extensible language (e.g., Extensible Markup Language (XML)) optimized so as to be easily read by the personal computer 1. The PC-use additional information 70 is of a read-only type and may not be changed.

At the time move-in is performed, when being supplied with content from the portable device 5 via the PD plug-in 75, the transport processor 63 reads PC-use additional information recorded in the portable device 5, supplies the additional information to the music management unit 64, and stores (records) the additional information in the music file storage unit 68-1. The PC-use additional information read from the portable device 5 is hereinafter referred to as the PC-use additional information 77 so as to be distinguished from the PC-use additional information 70 stored in the music file storage unit 68-1.

In addition, at the time move-out is performed, based on the music ID supplied from the GUI unit 61, the transport processor 63 controls the music management unit 64 to read the PC-use additional information 70 stored in the music file storage unit 68-1, and transfers the read information to the portable device 5 via the PD plug-in 75.

The PC-editing additional information 71 is music-related additional information managed by the personal computer 1. Accordingly, the PC-editing additional information 71 is described in a highly extensible language (e.g., XML language) optimized so as to be easily read by the personal computer 1. The PC-editing additional information 71 is readable and writable, and is changed by the user if necessary.

At the time move-in is performed, when being supplied with content from the portable device 5 via the PD plug-in 75, the transport processor 63 reads the PC-use additional information 77 recorded in the portable device 5, and creates the PC-editing additional information 71 by copying the read information for backup. The transport processor 63 supplies the created PC-editing additional information 71 to the music management unit 64 so that it is stored in the music file storage unit 68-1.

At the time move-out is performed, based on the music ID supplied from the GUI unit 61, the transport processor 63 controls the music management unit 64 to read the PC-editing additional information 71 stored in the music file storage unit 68-1, and abandons (deletes) it.

In addition, at the time of check-out, based on the music ID supplied from the GUI unit 61, the transport processor 63 controls the music management unit 64 to read the PC-editing additional information 71 stored in the music file storage unit 68-1, and transfers the read information to the portable device 5 via the PD plug-in 75.

The PD-used additional information 72 is music-related additional information managed by the portable device 5 and is stored in the music file storage unit 68-1 without being changed.

At the time move-in is performed, when being supplied with content from the portable device 5 via the plug-in 75, the transport processor 63 reads the PD-use additional information from the portable device 5, and supplies it to the music management unit 64 so that it is stored (recorded) in the music file storage unit 68-1. The PD-use additional information read from the portable device 5 is hereinafter referred to as the PD-use additional information 78 so as to be distinguished from the PD-use additional information 72 stored in the music file storage unit 68-1.

In addition, at the time move-out is performed, based on the music ID supplied from the GUI unit 61, the transport processor 63 controls the music management unit 64 to read the PD-use additional information 72 stored in the music file storage unit 68-1, and transfers the read information to the portable device 5 via the PD plug-in 75.

The content recorded in the music file storage unit 68-1 includes one having right information and one having no right information. The music file storage unit 68-1 can store at least one file corresponding to a piece of music. music file storage unit 68-1 corresponds to, for example, a drive letter. The drive letter corresponding to the music file storage unit 68-1 may be changed.

Since the music file storage unit 68-2 is similar in structure to the music file storage unit 68-1, a description thereof is omitted.

When the music file storage unit 68-1 or 68-2 does not hereinafter need to be separately distinguished, it is referred to simply as the music file storage unit 68.

Figure 6:
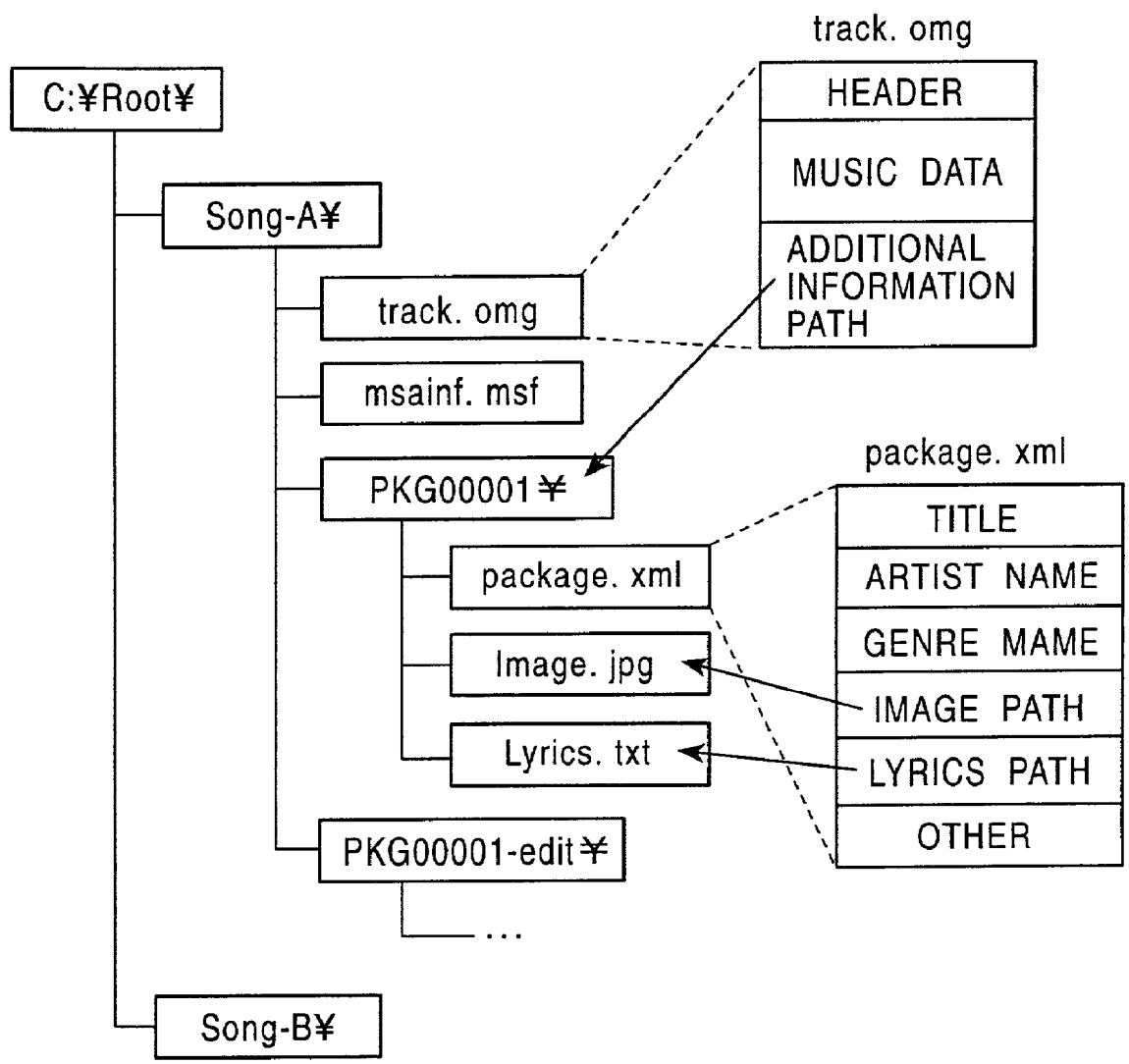
FIG. 6 is an illustration of the structure of data in a music file storage unit.

FIG. 6 is an illustration of the data structure of the music file storage unit 68. As shown in FIG. 6, the music file storage unit 68 includes a directory having, for example, the name "C:¥Root". In a lower layer, there are, for example, a directory which has the name "Song-A" and which stores music A, and a directory which has the name "Song-B" and which stores music B. When "¥" follows "C:¥Root", "Song-A", or "Song-B", the directory has a lower layer.

In the directory having the name "Song-A", a music file entitled "track.omg", PD-use additional information 72 entitled "maainf.msf", a directory having the name "PKG00001", and a directory having the name "PKG00001-edit" are stored.

The music file entitled "track.omg" consists of a header, music data, and an additional information path. Here, the additional information path represents the storage place of the PC-use additional information 70 in the form of a relative path. In other words, the music file entitled "track.omg" is linked to the directory having the name "PKG00001" by the additional information path.

In a layer lower than the directory having the name "PKG00001", a description file entitled "package.xml" of the PC-editing additional information 71, an image file entitled "Image.jpg", and a lyrics file entitled "Lyrics.txt" are stored.

In the description file entitled "package.xml" of the PC-editing additional information 71, a title, an artist name, a genre name, an image path, a lyrics path, other information, etc., are described. Here, the image path represents the storage place of the image file entitled "Image.jpg", and the lyrics path represents the storage place of the lyrics file entitled "Lyrics.txt". The image file entitled "Image.jpg" contains data of images such as a jacket, and the lyrics file entitled "Lyrics.txt" contains the lyrics (text) of the music.

Referring back to FIG. 3, in the portable device 5-1, the music file 67, the PC-use additional information 77, and the PD-use additional information 78 are recorded.

The music file 76 is a file including sound data of music. The music file 76 includes, in addition to the sound data, headers and additional information paths.

The PC-use additional information 77 is music-related additional information managed by the personal computer 1, and is recorded in the portable device 5 without being changed.

The PD-use additional information 78 is music-related additional information managed by the portable device 5-1. Accordingly, the PD-use additional information 78 is described in a simple format so as to be easily read by the portable device 5-1.

At the time of check-in, based on the music ID supplied from the GUI unit 61, the transport processor 63 uses the PD plug-in 78 to read the PD-use additional information 78 recorded in the portable device 5, and abandons (deletes) it. The transport processor 63 supplies the read PD-use additional information 78 to the music management unit 64 so that it may overwrite the PD-use additional information 72 stored in the music storage unit 68-1.

In the portable devices 5-2 and 5-3, the music file 76, the PC-use additional information 77, and the PD-use additional information 78 are recorded similarly to the portable device 5-1.

Figure 7:
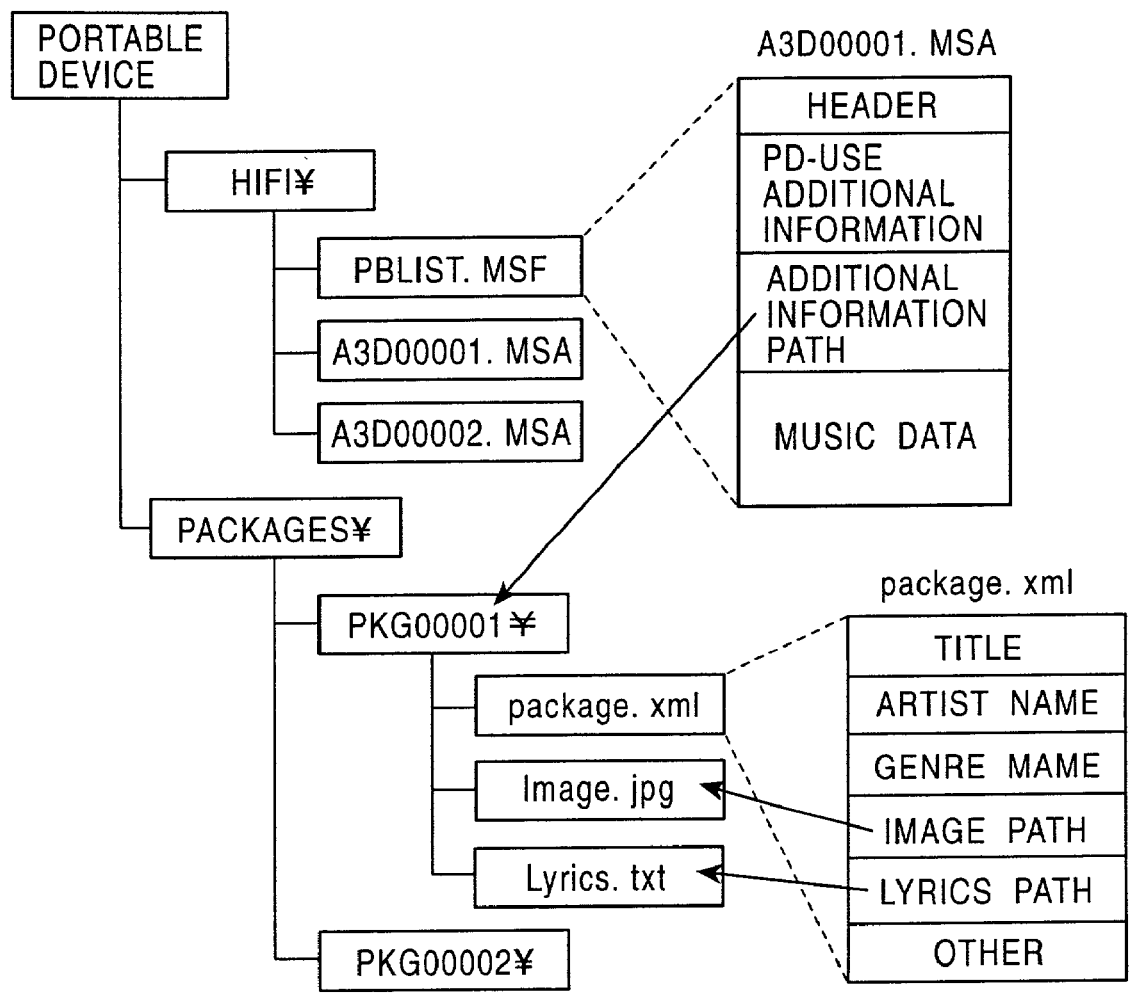
FIG. 7 is an illustration of the structure of data in a portable device

FIG. 7 is an illustration of the data structure of the portable device 5. As shown in FIG. 7, the portable device 5 has, for example, a directory for music file management which has the name "HIFI", and a directory for storing the PC-use additional information 77 which has the name "PACKAGES". When "Y" follows "HIFI" and "PACKAGES", the directory has a lower layer.

In the directory "HIFI", management information entitled "PBLIST.MSF" on the music file 76, the music file entitled "A3D00001.MSA" of music A, and the music file entitled "A3D00002.MSA" of music B are stored.

A music file entitled "A3D0001.MSA" consists of a header, PD-use additional information 78, an additional information path, and music data (music A). A music file entitled "A3D0002.MSA" similarly consists of a header, PD-use additional information 78, an additional information path, and music data (music B). Here, the additional information path uses an absolute path to represent a place in which PC-use additional information 77 is stored. In other words, the additional information path is used to link the music file entitled "A3D0001.MSA" to a directory which has the name "PKG00001" and which is lower than a directory having the name "PACKAGES".

In a layer lower than the directory having the name "PACKAGES", a directory which has the name "PKG00001" and which stores PC-use additional information on music A, a directory which has the name "PKG0002" and which stores PC-use additional information on music B exist.

In the directory "PKG00001", a description file entitled "package.xml" of PC-use additional information 77, an image file entitled "Image.jpg", and a lyrics file entitled "Lyrics.txt" are stored.

The description file entitled "package.xml" of PC-use additional information 77 describes a title, an artist name, a genre name, an image path, a lyrics path, other information, etc. Here, the image path represents a place in which the image file entitled "Image.jpg" is stored, and the lyrics path represents a place in which the lyrics path entitled "Lyrics.txt" is stored. The image file entitled "Image.jpg" is data of images such as a jacket cover, the lyrics path entitled "Lyrics.jpg" is lyrics (text) of the music.

Next, import of content is described with reference to FIG. 8.

The memory card 9-1 stores content which is permitted to be imported (shifted only once) and which is stored from the END server 3, the terminal unit 6, or the recording portable device 5-4.

When the content permitted to be imported is imported from the memory card 9-1 to the personal computer 1, check-out to, for example, the portable device 5-1 of content imported to the personal computer 1 is performed, and after the check-out, check-in from the portable device 5-1 is permitted. However, the content imported to the personal computer is not permitted to be shifted to the memory card 9-2. Definitely, shifting to the other memory card 9 is not permitted. In other words, the content stored in the memory card 9-1 is permitted to be shifted only once, and when it is imported (shifted once) from the memory card 9-1 to the personal computer, only check-in or check-out is permitted thereafter.

Figure 9:
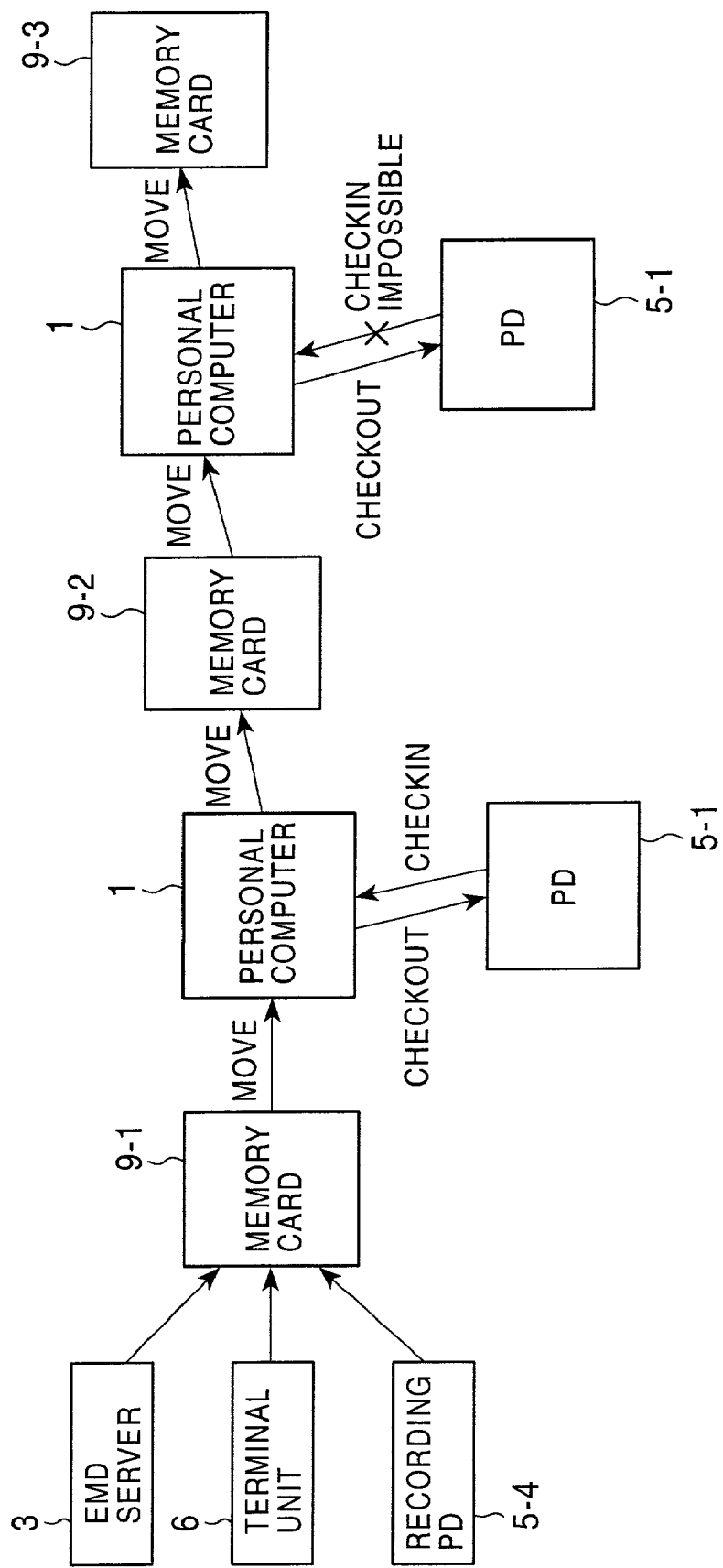
FIG. 9 is a block diagram illustrating movement.

Next, shifting of content is described with reference to FIG. 9.

The memory card 9-1 stores content which is permitted to be shifted and which is stored from the END server 3, the terminal unit 6, or the recording portable device 5-4. Content permitted to be shifted once (or imported) has been described with reference to FIG. 4. Accordingly, content permitted to be shifted twice or more is described.

When the content permitted to be shifted twice or more is shifted from the memory card 9-1 to the personal computer 1, check-out to the portable device 5-1 of the content shifted to the personal computer 1 is performed, and check-in thereof is permitted after the check-out.

The content shifted to the personal computer 1 is permitted to be shifted to the memory card 9-2. Also, the content shifted to the memory card 9-2 is permitted to be shifted to the personal computer 1.

However, after check-out to the portable device 5-1 from the personal computer 1 is performed, when the content is shifted to the memory card 9-3, the content stored in the portable device 5-1 is not permitted to be checked in to the personal computer 1.

Figure 10:
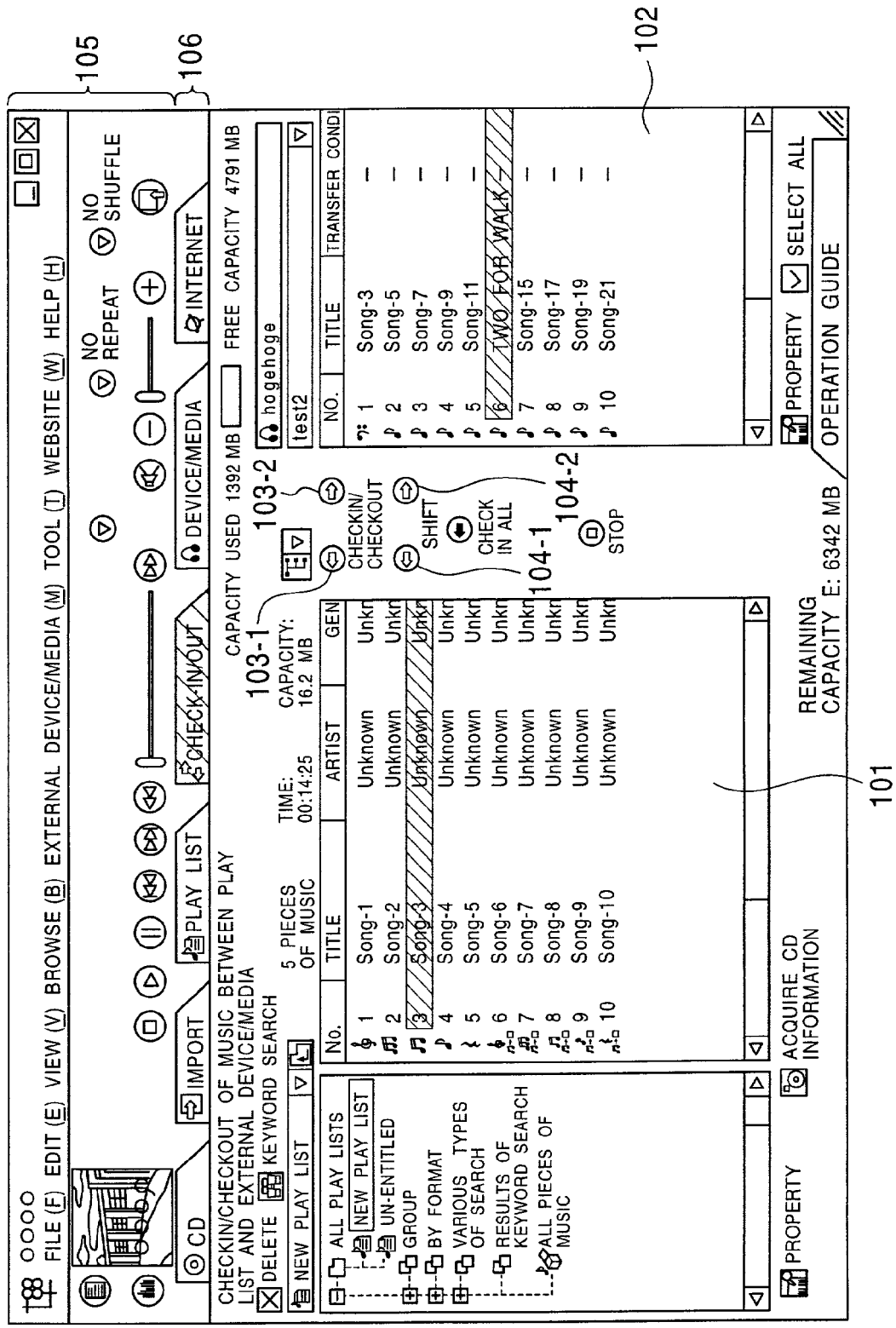
FIG. 10 is an illustration of a window displayed on a display.

FIG. 10 is an illustration of a window displayed on the display 20 by the GUI unit 61 when a jukebox application program to which the present invention is applied is loaded into the RAM 13 and is executed, and the user tries to perform check-in, check-out, move-in, or move-out of the content.

The GUI unit 61 controls the display 20 to display a window including a field 101 for displaying music names corresponding to pieces of the content stored in the personal computer 1, etc., a field 102 for displaying music names corresponding to pieces of the content stored in the portable device 5, etc., a check-in button 103-1, a check-out button 103-2, a move-in button 104-1, and a move-out button 104-2. The window shown in FIG. 10 also displays a player console 105, and tabs 106.

The check-in button 103 is operated when performing check-in to the personal computer 1 of content corresponding to a predetermined music name selected in the field 102, and the check-out button 103-2 is operated when performing check-out to the portable device 5 of content corresponding to a predetermined music name selected in the field 101.

By way of example, by operating the keyboard 18 or the mouse 19 to select a predetermined music name in the field 101, and subsequently pressing the check-out 103-2, the user can perform check-out of the content from the personal computer 1 to the portable device 5. By selecting a predetermined music name, and subsequently pressing the check-out button 103-1, the user can also perform check-out of the content from the portable device 5 to the personal computer 1. As a matter of course, it may be said that it is determined whether or not check-out or check-in of the selected content is permitted.

In addition to the above user's operation of selecting the predetermined music name in the field 101 and pressing the check-out button 103-2, the user can perform check-out of the content from the personal computer 1 to the portable device 5 by dragging (shifting) the predetermined music name while selecting it in the field 101 with a cursor 111, and dropping it, as shown in, for example, FIG. 7. Similarly, by dragging the predetermined music name while selecting it in the field 102 with the cursor 111, and dropping it onto the field 101, the user can perform check-in of the content from the portable device 5 to the personal computer 1.

The move-in button 104-1 is operated when performing move-in to the personal computer 1 of the content corresponding to the predetermined music name selected in the field 102, and the move-out button 104-2 is operated when performing move-out to the portable device 5 of the content corresponding to the predetermined music name selected in the field 101.

By way of example, by selecting the predetermined music name in the field 101, and subsequently pressing the move-out button 104-2, the user can perform move-out of the content from the personal computer 1 to the portable device 5. Also, by selecting the predetermined music name in the field 102, and subsequently pressing the move-in button 104-1, the user can perform move-in of the content from the portable device 5 to the personal computer 1. As a matter of course, it may be said that it is determined whether or not move-out or move-in of the selected content is permitted.

Figure 8:
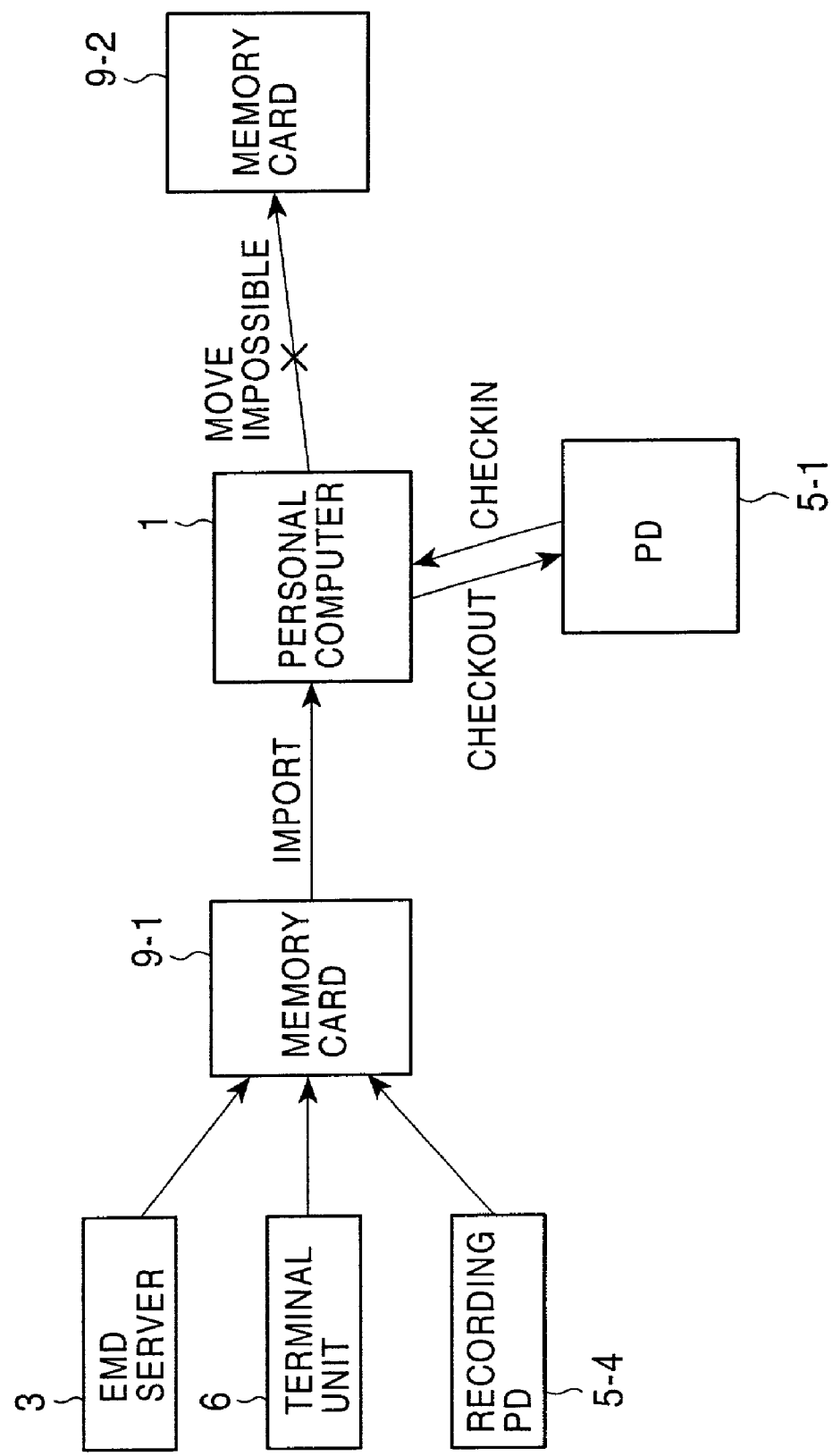
FIG. 8 is a block diagram illustrating import.

In addition to the above user's operation of selecting the predetermined music name in the field 101 and pressing the move-out button 104-2, by selecting the predetermined music name in the field 101 with the cursor 111 and dragging it to the field 102 while pressing a shift key, and dropping it, as shown in, for example, FIG. 8, the user can perform move-out of the content from the personal computer 1 to the portable device 5. Also, by dragging the predetermined music name to the field 101 while selecting it in the field 102 with the cursor 111, and dropping it there, the user can perform move-in of the content from the portable device to the personal computer 1.

As described above, when the drag and drop operation is used to perform check-out or move-out of the content, a transfer method for the check-out or the move-out is designated depending on whether or not the shift key has been pressed at the drop operation.

The player console 105 consists of various operation buttons used when the user plays back content data imported or shifted to the jukebox application program. The tabs 106 consist of a tab named "CD" (hereinafter referred to simply as a "CD tab", and this applies to the other ones), an "IMPORT" tab, a "PLAY LIST" tab, a "CHECK-IN/OUT" tab, a "Machine/Media" tab, and an "Internet" tab. In the present case, the fields 101 and 102 are displayed such that the user selects the "CHECK-IN/OUT" tab.

The "CD" tab is selected when playing back the content data recorded on a CD loaded into the drive 22. The "IMPORT" tab is selected in cases such as recording in a play list of content data that is not recorded as content data managed by the jukebox application program. The "PLAY LIST" tab is selected in cases such as playback of content data recorded in the play list, and editing of preferable sets of content data. The "CHECK-IN/OUT" tab is selected in cases such as check-in of content data from an external devices such as the portable device 5, and check-out of content data to the portable device 5. The "Internet" tab is selected in cases such as downloading of desired content by connecting the Internet 2.

In the window shown in FIG. 10, for example, when the user selects a music name entitled "TWO FOR WALK" from among pieces of music displayed in the field 102 with the keyboard 18 or the mouse 19, and presses the move-in button 104-1, the transport processor 63 uses the PD plug-in 75 to initiate processing for performing transfer (move-in) via the music management unit 64 and the file retrieval unit 66 of the content supplied from the portable device 5 via the PD plug-in 75. At this time, the GUI unit 61 controls the display 20 to display, for example, a dialog box 111 as shown in FIG. 11.

Figure 11:
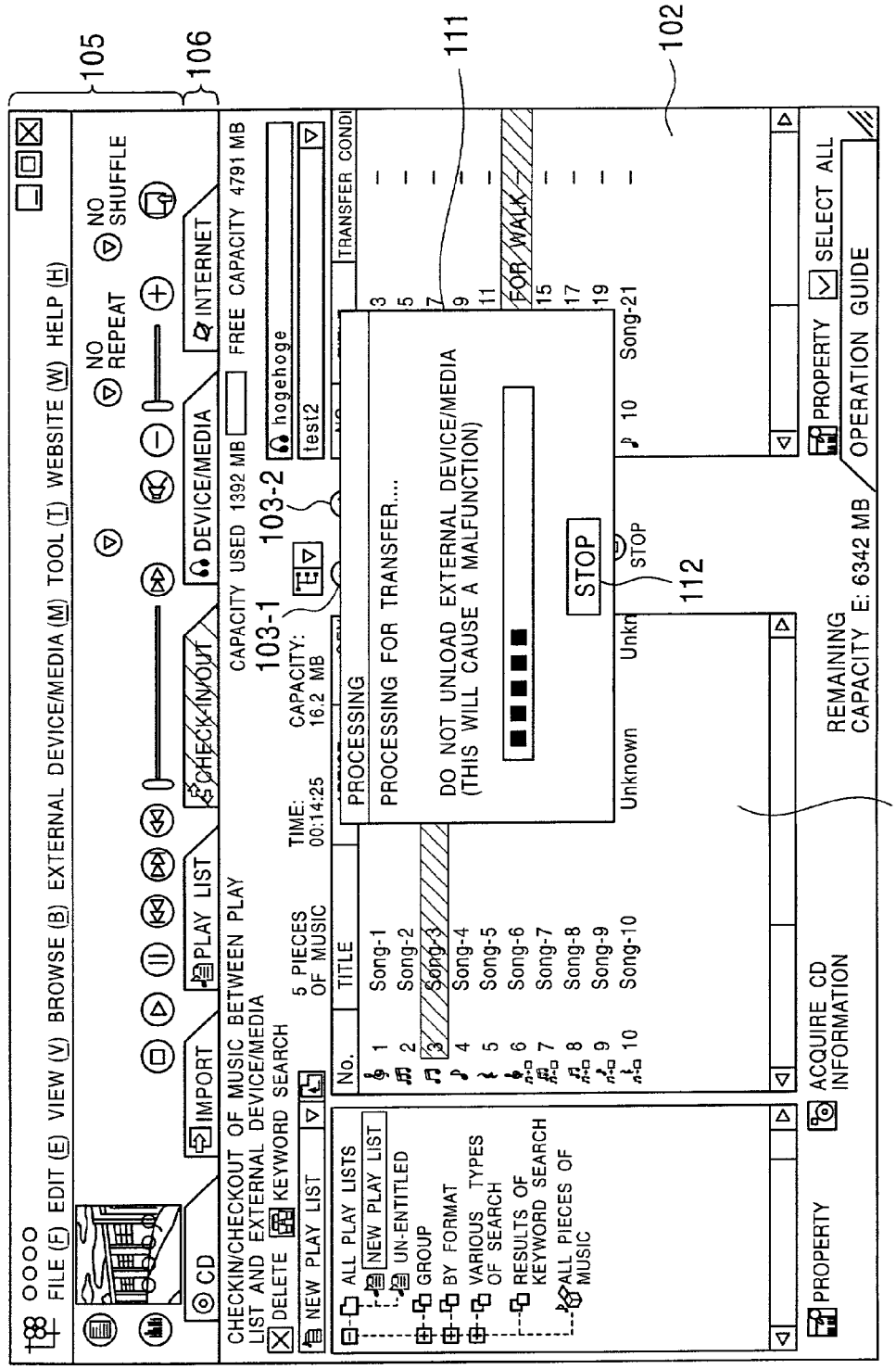
FIG. 11 is an illustration of a dialog box displayed on the window shown in FIG. 10.

In the dialog box 111 shown in FIG. 11, the message "Transferring now. Do not unload the external device/media (this will cause a malfunction)." and an interruption button 112 are displayed.

This enables the user to know that the selected content is being transferred (in the process of move-in). For interrupting transfer of the content, by selecting the interruption button 112, the processing can be interrupted.

Figure 12:
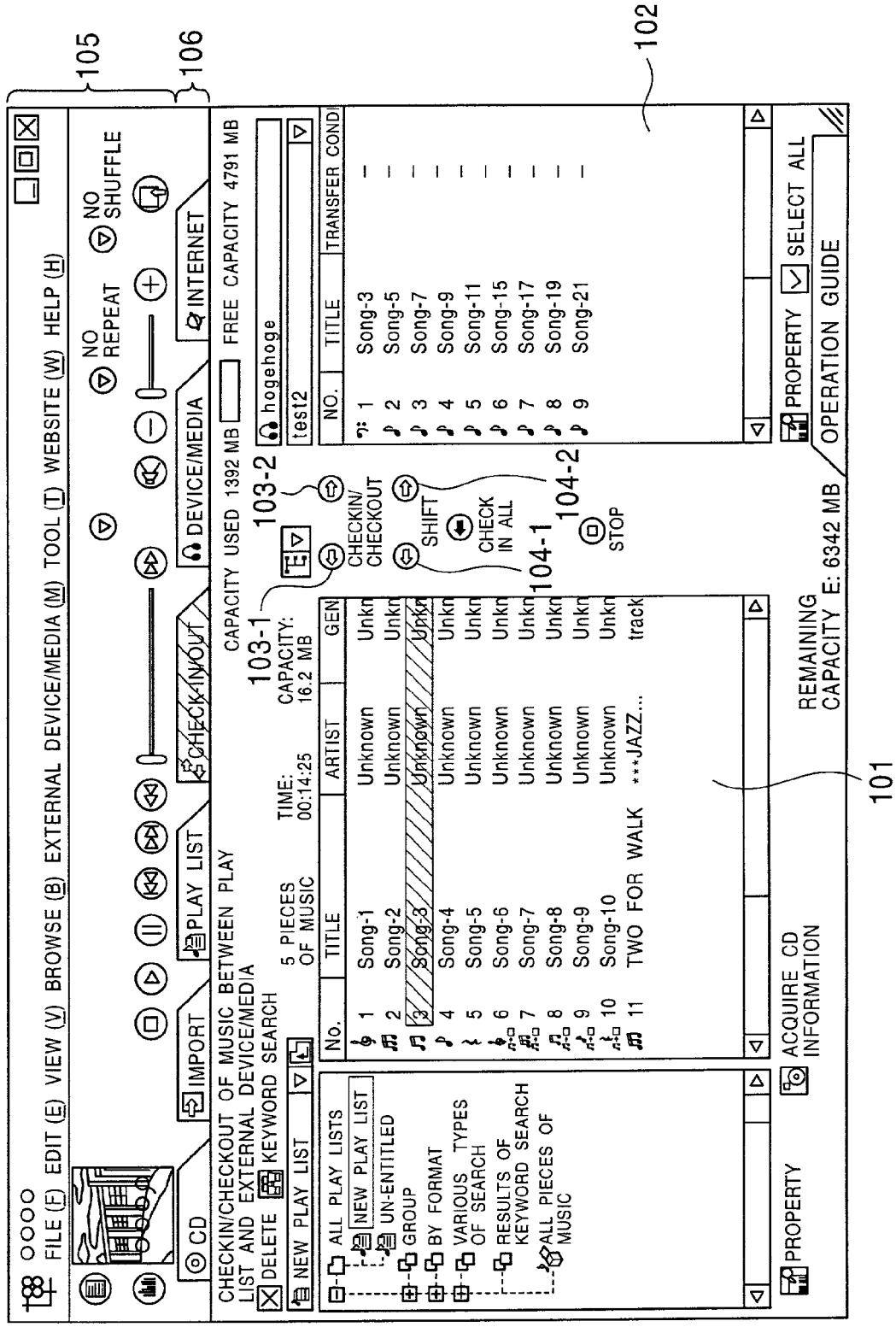
FIG. 12 is an illustration of a window displayed on a display.

When the transfer of the content by the transport processor 63 is terminated, the GUI 61 performs updating to the window shown in, for example, FIG. 12. Specifically, in the field 101, the music name "TWO FOR WALK" of the content that has just been moved in is displayed, and the music name "TWO FOR WALK" is deleted from the field 102.

By way of example, the user selects the music name "TWO FOR WALK" of the just-moved-in-content, and selects the item "Property" from among "File" items of the player part 102, whereby the GUI unit 61 displays, on the display 20, for example, a property screen as shown in FIG. 13.

As FIG. 13 shows, in the property screen, a tab 121 named "MUSIC INFORMATION", a tab 122 named "ADDITIONAL INFORMATION", a tab 123 named "FILE INFORMATION", etc., are arranged.

When the tab 121 named "MUSIC INFORMATION" is made active, the GUI unit 61 displays a title, an artist name, a genre name, a track name in album, a play time, the date and time of record, copyright information, conditions for use, etc.

By operating the keyboard 18 or the mouse 19, the user can change the title, the artist name, the genre name, or the track name, etc., in album of the music information shown in FIG. 13.

Figure 14:
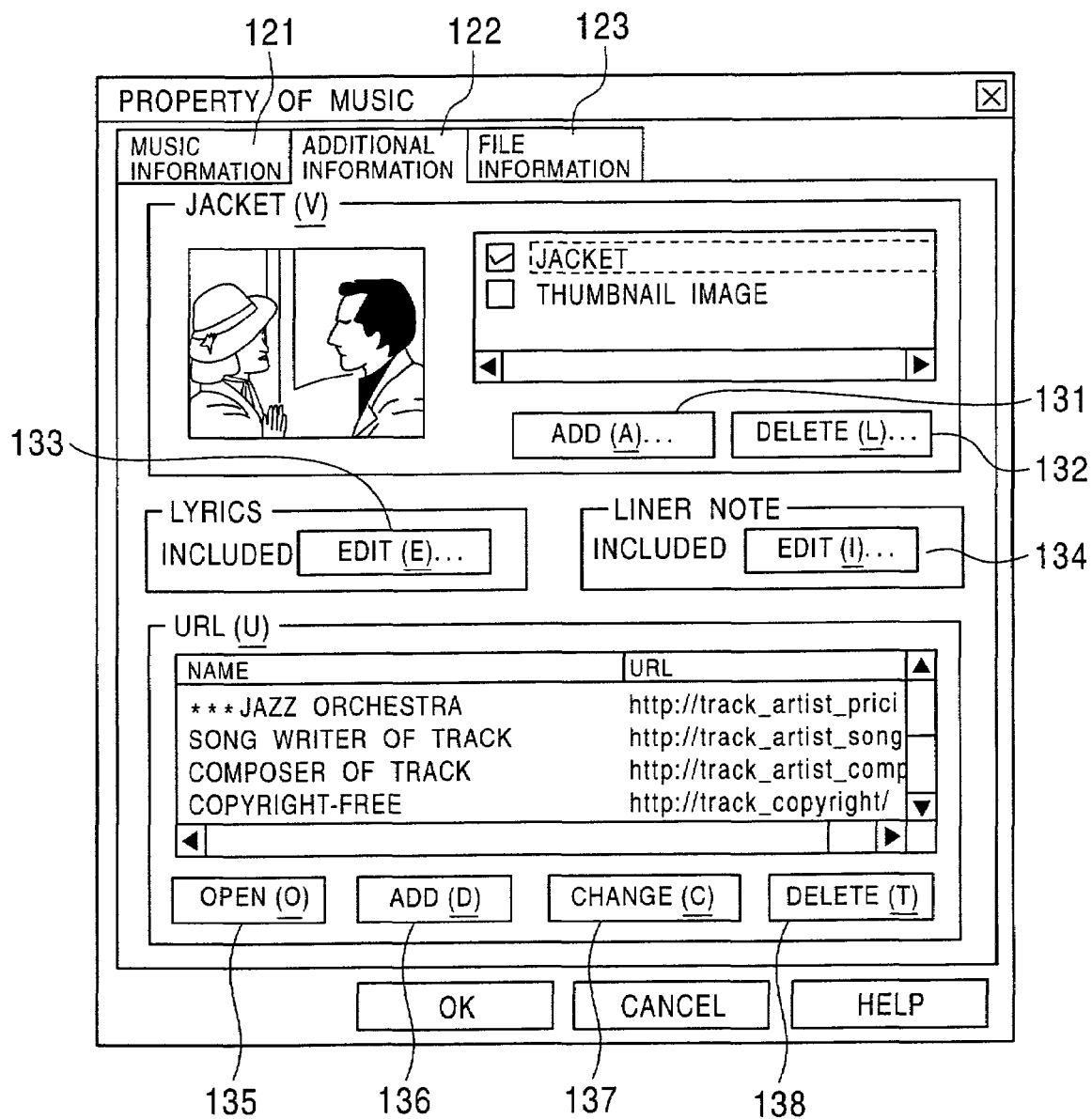
FIG. 14 is an illustration of another example of a property screen.

In addition, when the tab 122 named "ADDITIONAL INFORMATION" is made active, as FIG. 14 shows, the GUI unit 61 displays, for example, an addition button 131 that is selected when adding a jacket image or thumbnail image, etc., a deletion button 132 that is selected when deleting a recorded jacket image or thumbnail image, a lyrics editing button 133 that is selected when editing lyrics, a linear note editing button 134 that is selected when editing a linear note, a button 135 that is selected when accessing a web site providing the additional information of the music, an addition button 136 that is selected when adding a URL (Uniform Resource Locator) for accessing the web site providing the additional information, a change button 137 that is selected when changing a recorded URL, a deletion button 138 that is selected when deleting a recorded URL, etc.

Figure 15:
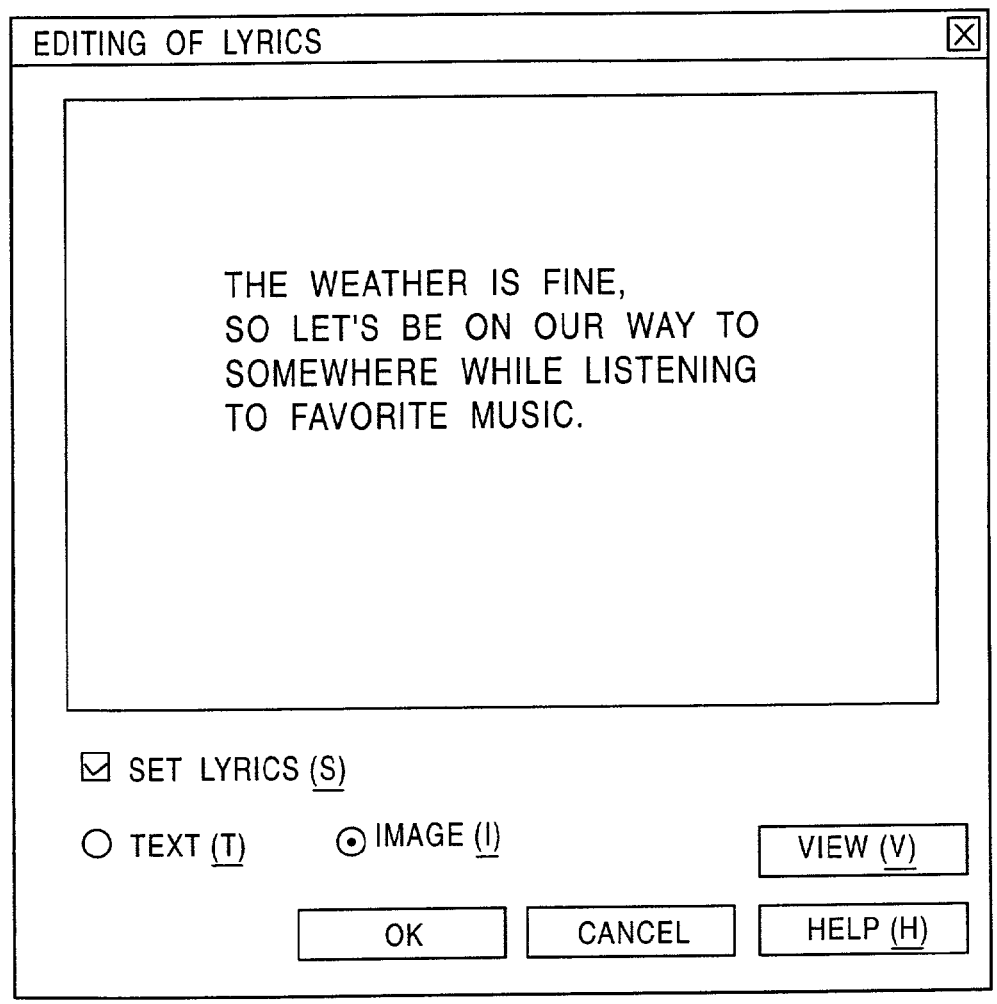
FIG. 15 is an illustration of a lyrics editing screen.

By way of example, when the user selects the lyrics editing button 133 in the property screen shown in FIG. 14, the GUI unit 61 displays, on the display 20, for example, a lyrics editing screen as shown in FIG. 15.

This enables the user to edit the lyrics in accordance with preferences on the lyrics editing screen shown in FIG. 15 by operating the keyboard 18.

Figure 16:
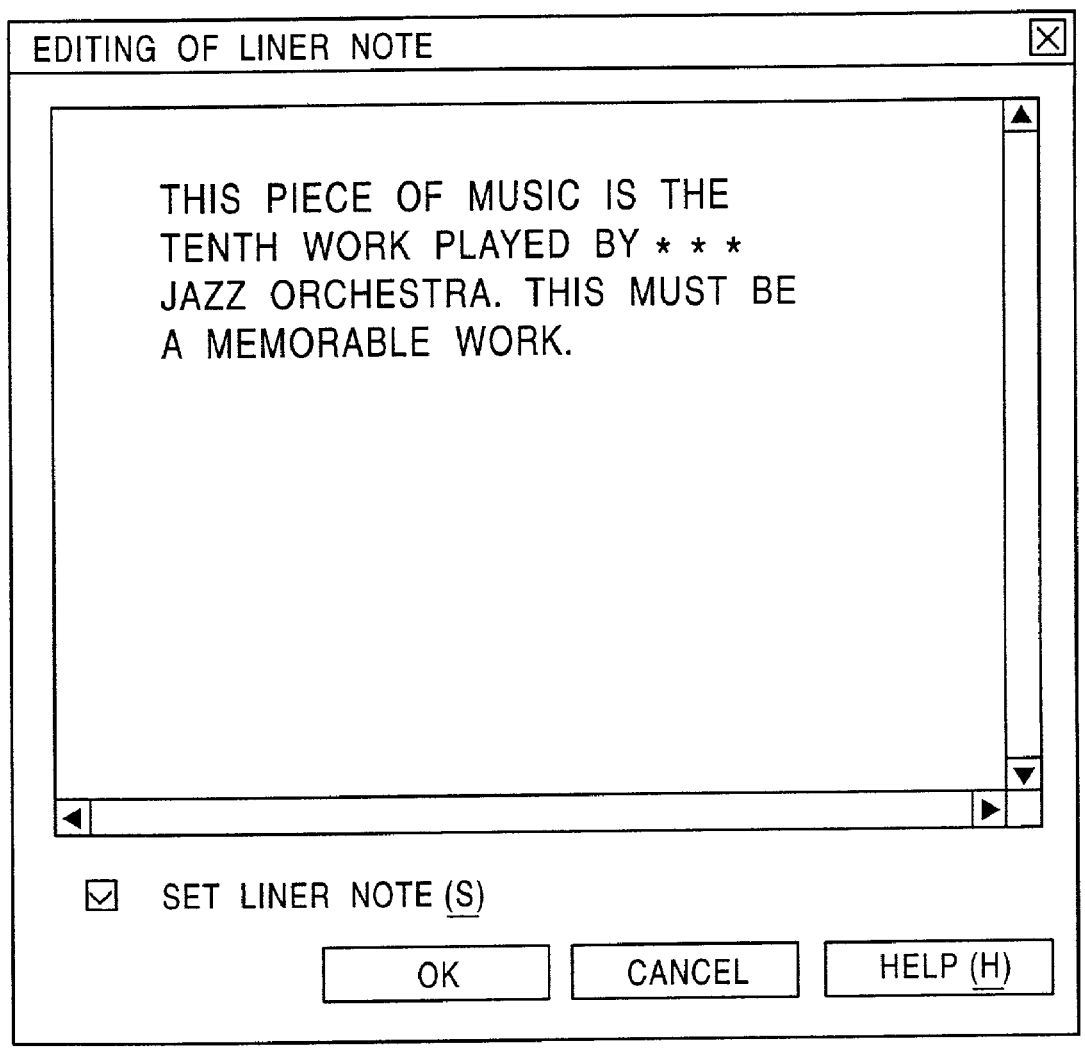
FIG. 16 is an illustration of a linear note editing screen.

Also, for example, when the user selects the linear note editing button 134 on the property screen shown in FIG. 14, the GUI unit 61 displays, on the display 20, for example, a linear note editing screen as shown in FIG. 16.

This enables the user to edit the linear note in accordance with preferences on the linear note editing screen by operating the linear note editing screen shown in FIG. 16.

Figure 17:
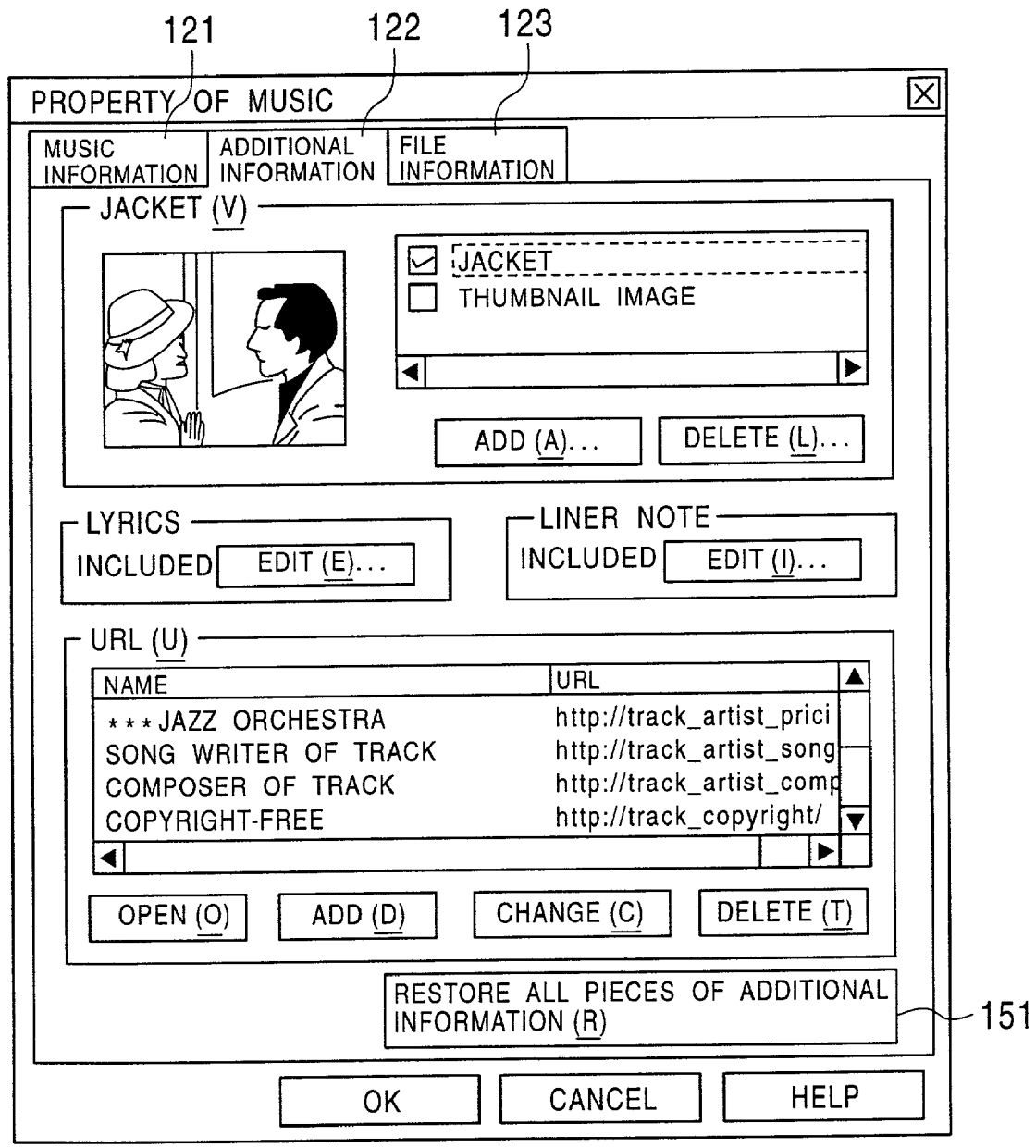
FIG. 17 is an illustration of a property screen.

After the lyrics or the linear note is edited by the user, as described above, the GUI unit 61 displays, for example, a property screen as shown in FIG. 17. Since the lyrics or the linear note has been rewritten based on the editing operation by the user, the GUI unit 61 displays a back button 151 for returning the lyrics or the linear note to the original.

Accordingly, when mistakenly erasing the edited additional information, the user can easily restore the original additional information by selecting the back button 151.

Next, the operation of the embodiment of the present invention is described below with reference to flowcharts.

First, a content distribution process is described below.

When distributing content, for example, to the portable device 5 via the network 2, the EMD server 3 generates PC-use additional information 77, which can be read by the personal computer 1, and PD-used additional information 78, which can be read by the portable device 5. The EMD server 3 uses a highly extensible format to describe the PC-use additional information 77 and uses a simple format to describe the PD-use additional information 78. The EMD server 3 adds them to the content before distributing the content.

After the PC-use additional information 77 is downloaded, it is recorded in the portable device 5 without being changed. After the PD-used additional information 78 is recorded in the portable device 5, it can be displayed on a display (not shown) in accordance with a user's operation.

When move-in to, for example, the personal computer 1 of the content recorded in the portable device 5 is performed, the PC-use additional information 77 and the PD-used additional information 78 are transferred to the personal computer 1 with the content. The transferred PD-used additional information 78 is recorded as the PD-used additional information 72 in the personal computer 1 without being changed. After the PC-use additional information 77 is recorded as the PC-use additional information 70 in the personal computer 1, it can be displayed on the display 20 in accordance with a user's operation.

As described above, after adding PC-use additional information displayable by the personal computer 1 and PD-used additional information displayable by the portable device 5 to content, the EMD server 3 distributes the content. This enables each of the personal computer 1 and the portable device 5 to display the additional information described in its readable format if necessary.

A process for transferring content and additional information in the case of performing move-in (including import) of content from the portable device 5 to the personal computer 1 is described below with reference to the flowchart of FIG. 18.

When the user selects a music name to be moved in from music names in the field 102 on the window in FIG. 10, and presses the move-in button 104-1, in step S1, the transport processor 63 performs preprocess authentication for move-in. In the preprocess authentication for move-in, the transport processor 63 performs, for example, determination of whether or not the content corresponding to the selected music name can be moved in, determination of whether or not the content corresponding to the selected music name is valid without being interpolated, or determination of whether or not the portable device 5, to which content is distributed, is valid.

After succeeding in the authentication, in step S2, the transport processor 63 copies in a converted form the music file 76 recorded in the portable device 5 to the personal computer 1. Specifically, the transport processor 63 uses the PD plug-in 75 to read the music file 76 (e.g., the music file entitled "A3D00001.MSA" in the directory having the name "HIFI" shown in FIG. 7) recorded in the portable device 5, converts the read music file 76, and stores the converted file as the music file 69 in the music file storage unit 68 by using the music management unit 64, the file retrieval unit 66, and the database 67.

In step S3, the transport processor 63 acquires additional information path from the music file 76 recorded in the portable device 5. Specifically, the transport processor 63 uses the PD plug-in 75 to acquire an additional information path (the storage place of the PC-use additional information 77) included in the music file 76 (the music file entitled "A3D00001.MSA" in the present case) recorded in the portable device 5.

In step S4, the transport processor 63 reads the PC-use additional information 77 from the additional information path acquired in step S3, and copies the read PC-use additional information 77 to the personal computer 1. Specifically, the transport processor 63 uses the PD plug-in 75 to read the PC-use additional information 77 (the directory having the name "PKG00001" in the directory having the name "PACKAGES" shown in FIG. 7 in the present case) recorded in the portable device 5, and creates a copy of the read PC-use additional information 77 so that it is stored as the PC-use additional information 70 in the music file storage unit 68 by using the music management unit 64, the file retrieval unit 66, and the database 67.

In step S5, the transport processor 63 creates, in the personal computer 1, a backup copy of the PD-used additional information 78 recorded in the portable device 5. Specifically, the transport processor 63 uses the PD plug-in 75 to read the PD-used additional information 78 (PD-used additional information 78 included in the music file entitled "A3D00001.MSA" in the present case) stored in a directory for managing the music file 76 recorded in the portable device 5, creates a backup copy of the read PD-used additional information 78 so that it is stored in the music file storage unit 68 by using the music management unit 64, the file retrieval unit 66, and the database 67.

In step S6, the transport processor 63 sets (writes) an additional information path in the music file 69 in the personal computer 1. Specifically, the transport processor 63 sets, in the music file 69 stored (copied) in the music file storage unit 68 in step S2, an additional information path representing the storage place of the PC-use additional information 70 stored in the music file storage unit 68 in step S4.

In step S7, the transport processor 63 determines whether or not the music file 69 and the additional information (the PC-use additional information 70 and the PD-used additional information 72) have successfully be written, that is, whether or not the music file 69 and the additional information are correctly stored in the music file storage unit 68. If the transport processor 63 has determined that the music file 69 and the additional information have successfully be written, it proceeds to step S8, and performs move-in post-process authentication. The move-in post-process authentication includes determination of whether or not the content has been correctly moved in to the music file storage unit 68 of the database 67, and determination of whether or not a missing file is detected.

In step S9, the transport processor 63 uses the PD plug-in 75 to delete the PC-use additional information 77 (the directory having the name "PKG00001" in the directory having the name "PACKAGES" shown in FIG. 7 in the present case) in the portable device 5.

In step S10, the transport processor 63 uses the PD plug-in 75 deletes the music file 76 (the music file entitled "A3D00001.MSA" in the directory having the name "HIFI" in the present case) in the portable device 5.

When move-in of the content normally ends by performing steps S1 to S10, the GUI unit 61 displays, in the field 101 shown in FIG. 10, the music name corresponding to the content that has been moved in, and deletes an identical music name in the field 102.

When the user selects, for example, the music name corresponding to the content that has been moved in, and selects the "PROPERTY" item from the "FILE" item, in step S11, the GUI unit 61 displays the PC-use additional information 70 on the display 20. Accordingly, a property screen as shown in FIG. 13 is displayed on the display 20.

In step S7, if the transport processor 63 has determined that the music file 69 and the additional information have not successfully be written, that is, that the music file 69 and the additional information are not stored in the music file storage unit 68, the transport processor 63 proceeds to step S12, and deletes the music file 69 copied to the music file storage unit 68 in step S13. In step S14, the transport processor 63 deletes the PD-used additional information 72 copied to the music file storage unit 68 in step S5, and the process ends.

As described above, in the case of performing move-in to the personal computer 1 of content recorded in the portable device 5, when music file and additional information of the content are firstly copied to the personal computer 1, and it is determined that the music file and the additional information have successfully been written, the music file and the additional information in the portable device 5 are deleted. Thus, the content and the additional information can be transferred without reducing data.

Also, since PC-use additional information described in a highly extensible format and PD-used additional information described in a simple format are distributed with content from the EMD server 3, the PC-use additional information 70 can be displayed by the personal computer 1, and the PD-used additional information 78 can be displayed by the portable device 5.

Figure 19:
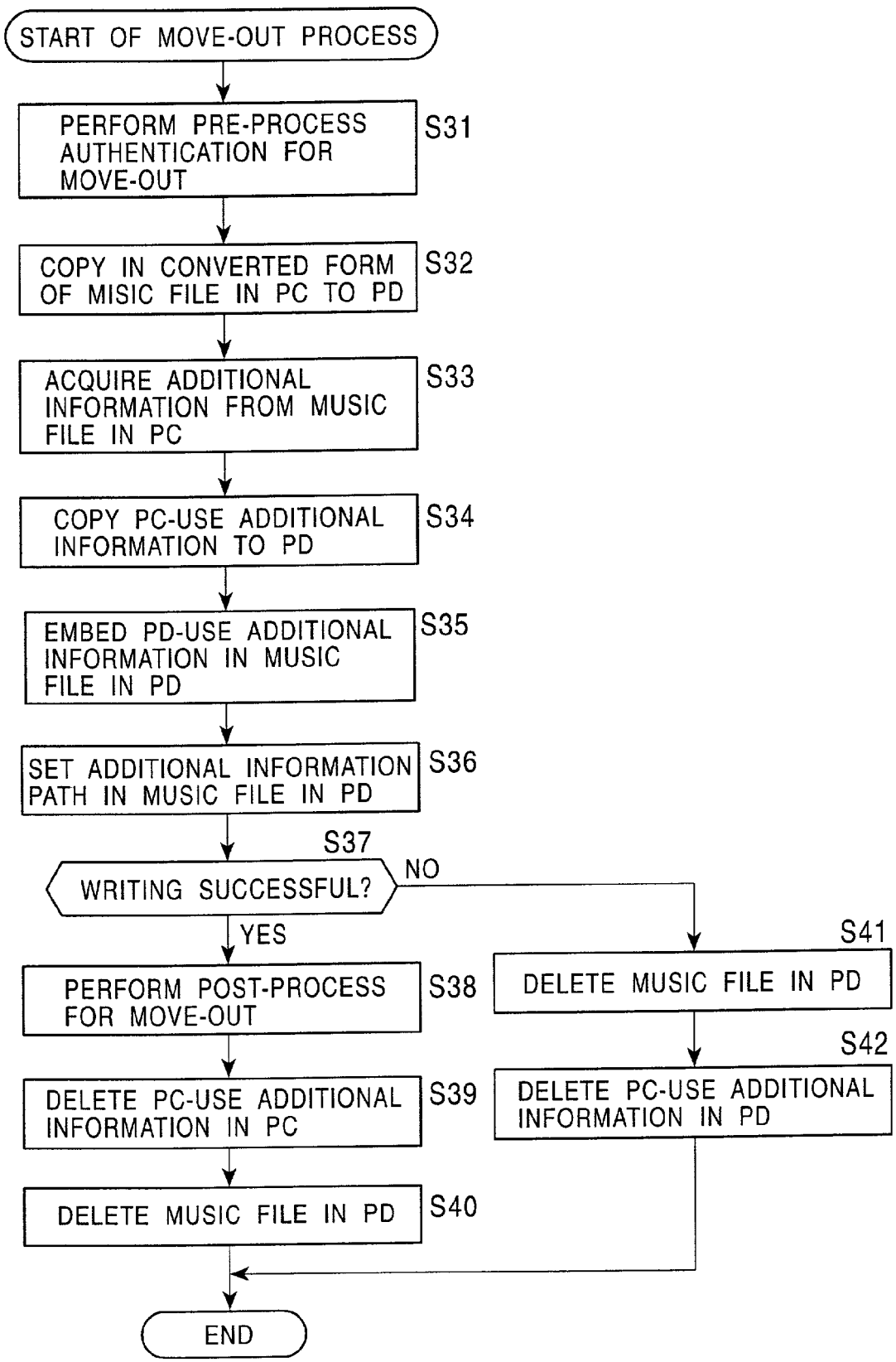
FIG. 19 is a flowchart illustrating a move-out process.

A process for transferring content and additional information in the case of moving out content from the personal computer 1 to the portable device 5 is described below with reference to the flowchart shown in FIG. 19.

When the user selects a music name to move out from music names in the field 101 on the window shown in FIG. 10, and presses the move-out button 104-2, in step S31, the transport processor 63 performs preprocess authentication for move-out. The preprocess authentication for move-out includes, for example, determination of whether or not content corresponding to the selected music name can be moved out, determination of whether or not the content is valid without being interpolated, or determination of whether or not the portable device 5, to which the content is distributed, is valid.

After succeeding in the authentication, in step S32, the transport processor 63 copies in a converted form the music file 69 stored in the music file storage unit 68 of the database 67 to the portable device 5. Specifically, the transport processor 63 reads the music file 69 (the music file entitled "track.omg" in the directory having the name "Song-A" shown in FIG. 6) recorded in the music file storage unit 68, and creates a copy in converted form of the read music file 69 so that it is recorded as the music file 76 in the portable device 5 by using the PD plug-in 75.

In step S33, the transport processor 63 acquires an additional information path (the storage place of the PC-use additional information 70) included in the music file 69 (the music file entitled "track.omg" in the present case) stored in the music file storage unit 68 of the database 67.

In step S34, the PC-use additional information 70 is read from the additional information path acquired in step S33 and is copied to the portable device 5 by the transport processor 63. Specifically, the transport processor 63 reads the PC-use additional information 70 (the directory having the name "PKG00001" in the directory having the name "Song-A" as shown in FIG. 6 in the present case) stored in the music file storage unit 68, and copies the read PC-use additional information 70 so that it is recorded as PC-use additional information 77 in the portable device 5.

In step S35, the transport processor 63 reads the PD-used additional information 72 (the PD-used additional information 72 entitled "msainf.msf" in the directory having the name "Song-A" shown in FIG. 6 in the present case) stored in the music file storage unit 68, and embeds the read PD-used additional information 72 in the music file 76 copied to the portable device 5 in step S32. For example, the PD-used additional information 78 is embedded in the music file entitled "A3D00001.MSA in the directory having the name "HIFI" shown in FIG. 7.

In step S36, the transport processor 63 sets, in the music file 76 recorded in (copied to) the portable device 5 in step S32, an additional information path representing the storage place of the PC-use additional information 77 recorded in the portable device 5 in step S34.

In step S37, the transport processor 63 determines whether or not the music file 76 and the additional information (PC-use additional information 77 and the PD-used additional information 78) have successfully been written. If the transport processor 63 has determined that they have successfully been written, it proceeds to step S38, and performs a move-out post-process. The move-out post-process includes, for example, determination of whether or not the content has successfully moved out to the portable device 5, or determination of whether or not a missing file is detected.

In step S39, the transport processor 63 deletes the PC-use additional information 70 (the directory having the name "PKG00001" in the directory having the name "Song-A" shown in FIG. 6 in the present case) stored in the music file storage unit 68 of the database 67.

In step S40, the transport processor 63 deletes the PD-used additional information 72 (the PD-used additional information entitled "msaint.msf" in the directory having the name "Song-A" shown in FIG. 6 in the present case) stored in the music file storage unit 63.

After the move-out of the content normally ends by performing steps S31 to S40, the GUI unit 61 displays, in the field 102 shown in FIG. 10, a music name corresponding to the content that has been moved out, and deletes an identical music name in the field 101.

In step S37, if the transport processor 63 has determined that the music file 76 and the additional information have not successfully been written, it proceeds to step S41, and deletes the music file 76 copied to the portable device 5 in step S32. In step S42, the transport processor 63 deletes the PC-use additional information 77 copied to the portable device 5 in step S42, and the process ends.

As described above, in the case of moving out content recorded in the personal computer 1 to an external device, when a music file and additional information of content are firstly copied to the portable device 5, and it is determined that the music file and the additional information have successfully been written (copied), the music file and the additional information in the personal computer 1 are deleted. Thus, the content and the additional information can be transferred without reducing data.

In the above case, the PC-use additional information 70 is displayed on the display 20 in the personal computer 1. However, the present invention is not limited to the case, but a backup copy of the PC-use additional information 70 is created and displayed as PC-editing additional information 71 on the display 20.

Next, a process for transferring content and additional information in the case of move-in of the content from the portable device 5 to the personal computer 1 is described below with reference to the flowchart shown in FIG. 20.

Figure 18:
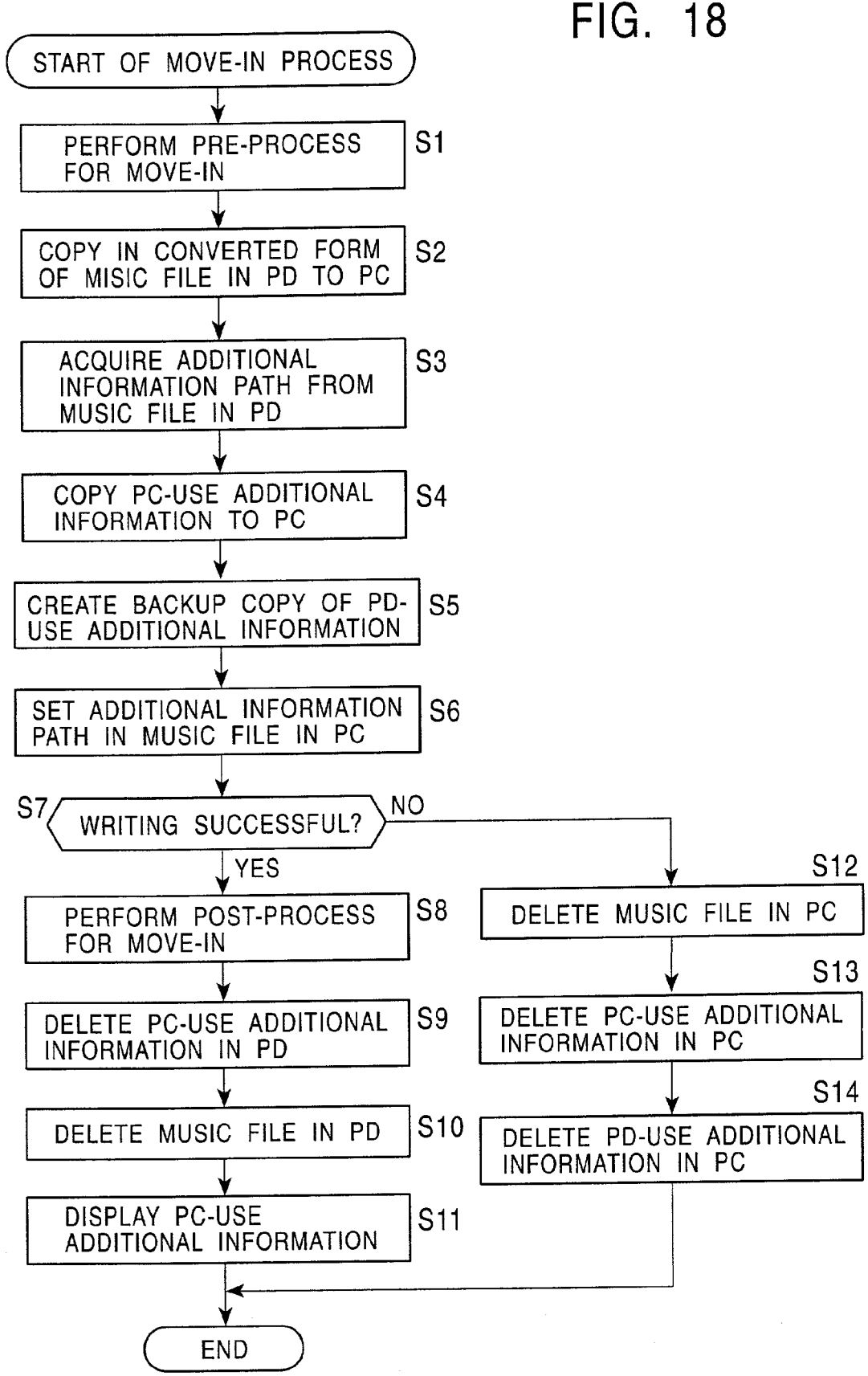
FIG. 18 is a flowchart illustrating a move-in process.
Figure 20:
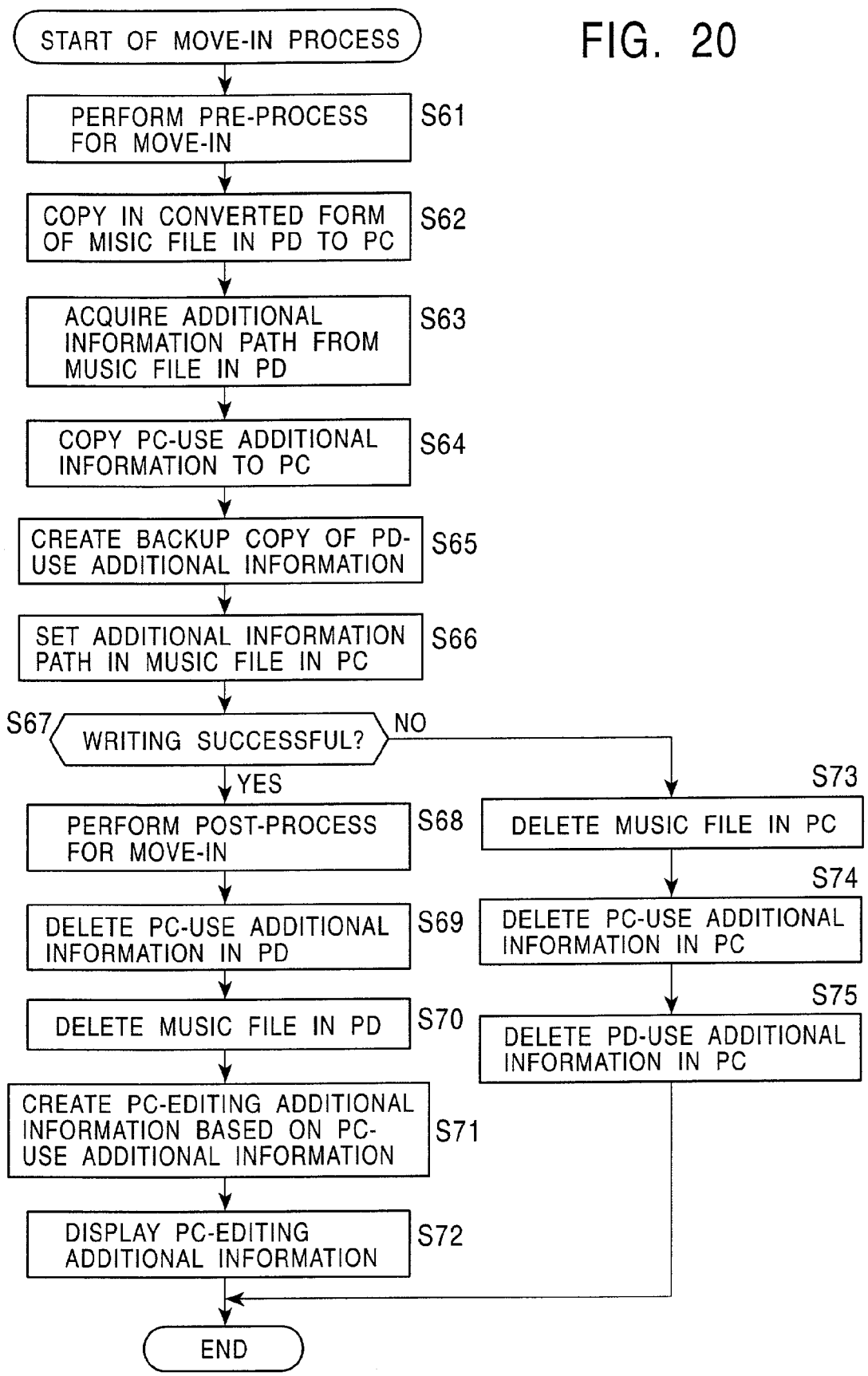
FIG. 20 is a flowchart illustrating a move-in process.

Since steps S61 to S70 shown in FIG. 20 are identical to steps S1 to S10 shown in FIG. 18, respectively, descriptions thereof are omitted.

In step S71, the transport processor 63 reads the PC-use additional information 70 copied to the music file storage unit

68 of the database 67 in step S64, and creates, as PC-editing additional information 71, a backup copy of the read PC-use additional information 70.

After the move-in of the content ends by performing steps S61 to S61, the GUI unit 61 displays a music name corresponding to the content that has been moved in, and deletes an identical name in the field 102.

By selecting, for example, the music name corresponding to the content that has been moved in and selecting the "PROPERTY" item from the "FILE" item in the player part 102 by the user, in step S72, the GUI unit 61 displays the PC-editing additional information 71 on the display 20. This displays a property screen as shown in FIG. 13 on the display 20.

Since steps S73 to S75 are identical to steps S12 to S14 shown in FIG. 18, respectively, descriptions thereof are omitted.

By displaying the PC-editing additional information 71 on the display 20, the original PC-editing additional information 70 is prevented from being edited by the user. Accordingly, even when the user edits the additional information to match user's preferences, by abandoning the PC-editing additional information 71 and transferring the original PC-use additional information 70 when performing the move-out, additional information customized by the user can be prevented from being distributed.

Also a manufacturer providing content can prevent content having invalid additional information from being distributed, so that content can be distributed at ease, and a market of music distribution service can be expanded.

In the foregoing, the additional information transfer in the case of performing move-in or move-out of content has been described. In other words, when the personal computer 1 stores the PC-use additional information 70, the PC-editing additional information 71, and the PD-used additional information 72, uses the PC-use additional information 70 or the PC-editing additional information 71 to edit the additional information, and performs move-out of the content to the portable device 5, the PC-use additional information 70 recorded in the personal computer 1 is transferred, and the PD-used additional information 72 is transferred to the portable device 5 without being changed.

When the portable device 5 stores the PC-use additional information 77 and the PD-used additional information 78, and performs move-in of the content to the personal computer 1, the PD-used additional information 78 recorded (stored) in the portable device 5 is transferred, and the PC-use additional information 77 is transferred to the personal computer 1 without being changed.

Next, a process for transferring content and additional information in the case of performing check-out of the content from the personal computer 1 to the portable device 5 is described below with reference to the flowchart shown in FIG. 21.

By selecting a music name to check out from music names in the field 101 shown in FIG. 10, and pressing the checkout button 103-2, in step S91, the transport processor 63 performs a preprocess authentication for check-out. The preprocess authentication for check-out includes, for example, determination of whether or not content corresponding to the selected music name can be checked out, determination of whether or not the content is valid without being interpolation, or determination of whether or not the portable device 5, to which the content is distributed, is valid.

After succeeding in the authentication, the transport processor 63 copies in converted form to the music file 69 stored in the music file storage unit 68 of the database 67. In step S93, the transport processor 63 acquires, from the music file 69, an additional information path stored in the music file storage unit 68 of the database 67.

In step S94, the PC-editing additional information 71 stored in the music file storage unit 68 of the database 67 is read and copied to the portable device 5 by the transport processor 63. Specifically, the transport processor 63 reads the PC-editing additional information 71 (the directory having the name "PKG00001-edit" in the directory having the name "Song-A" shown in FIG. 6 in the present case) stored in the music file storage unit 68, and uses the PD plug-in 75 to copies the read information to the portable device 5. This records the PC-use additional information 77 in the portable device 5.

In step S95, PD-used additional information 72 is created based on the PC-editing additional information 71 read in step S94, and is embedded in the music file 76 copied to the portable device 5 in step S92 by the transport processor 63. In step S95, the transport processor 63 sets an additional information path in the music file 76 in the portable device 5.

In step S97, the transport processor 63 determines whether or not the music file 76 and the additional information have successfully been written. If it has determined that they have successfully been written, it proceeds to step S98, and performs a post-process for check-out. The post-process check-out includes, for example, determination of whether or not correct check-out of the content to the portable device 5 has been performed, determination of whether or not a missing file is detected, or updating of the remaining number of times the check-out is performed.

In step S95, if the transport processor 63 has determined that the music file 76 and the additional information have not successfully been written, it proceeds to step S99. Descriptions of steps S99 and S100 are omitted since they are identical to steps S41 and S42 shown in FIG. 19, respectively.

As described above, when check-out to an external device such as the portable device 5 of content recorded in the personal computer 1 is performed, a copy edited in the personal computer 1 of the PC-editing additional information 71 is transferred as PD-used additional information 72, and is embedded in the music file 76. Thus, it is possible to match the PC-use additional information 70 displayed on the display 20 in the personal computer 1 with the PD-used additional information 78 displayed on a display (not shown) of the portable device 5, so that user's convenience can be improved.

In addition, the user can edit the PD-used additional information 78 displayed by the portable device 5, and the edited PD-used additional information 78 is abandoned in check-in mode. The edited PD-used additional information 78 may overwrite the PD-used additional information stored in the music file storage unit 68 of the personal computer 1.

External devices such as the portable device 5 include those having no display functions such as the display 20 of the personal computer 1. It is useless to transfer additional information of content to such a type of external device, and content transfer requires time.

Accordingly, when the user performs check-out of content to the portable device 5, which has no display function, transfer of additional information can be cancelled. In this case, the user controls the GUI unit 61 to display, for example, a setting screen as shown in FIG. 22 on the display 20 by selecting, for example, the "SETTING" item in the "TOOL" item of the player part 102 of the window shown in FIG. 10.

Figure 22:
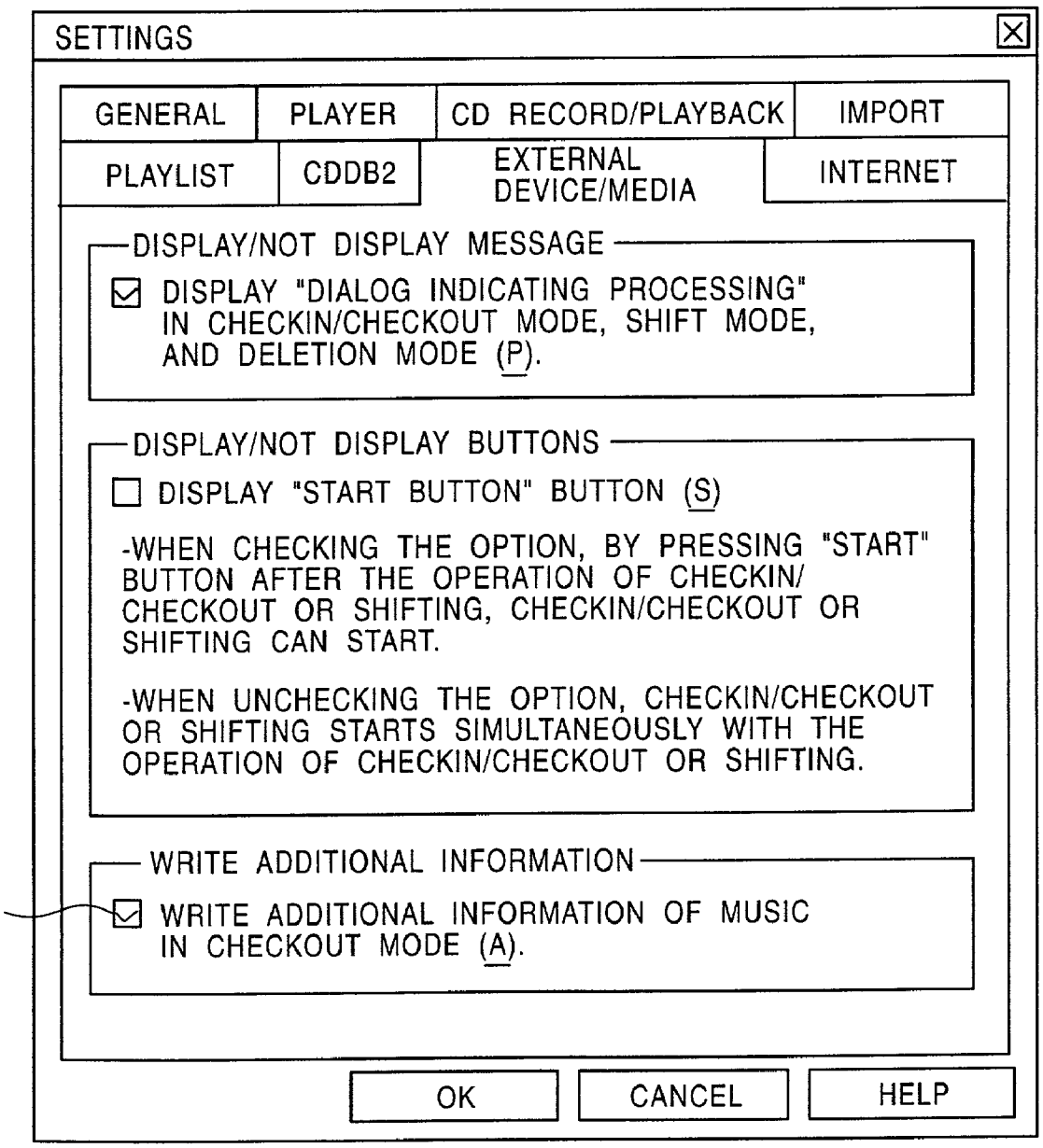
FIG. 22 is an illustration of a setting screen.

As FIG. 22 shows, the setting screen has a plurality of tabs. When the tab "EXTERNAL DEVICE/MEDIA" is made active, the GUI unit 61 displays a checkbox for settings such as whether to display a message, whether to display buttons, and whether to write the additional information.

The user can transfer the additional information in the check-out mode by checking a check box 161 among the check-out boxes shown in FIG. 22 which is for setting writing or not writing of the additional information. Also by unchecking the checkbox 161, the additional information can be prevented from being transferred in the check-out mode.

Figure 23:
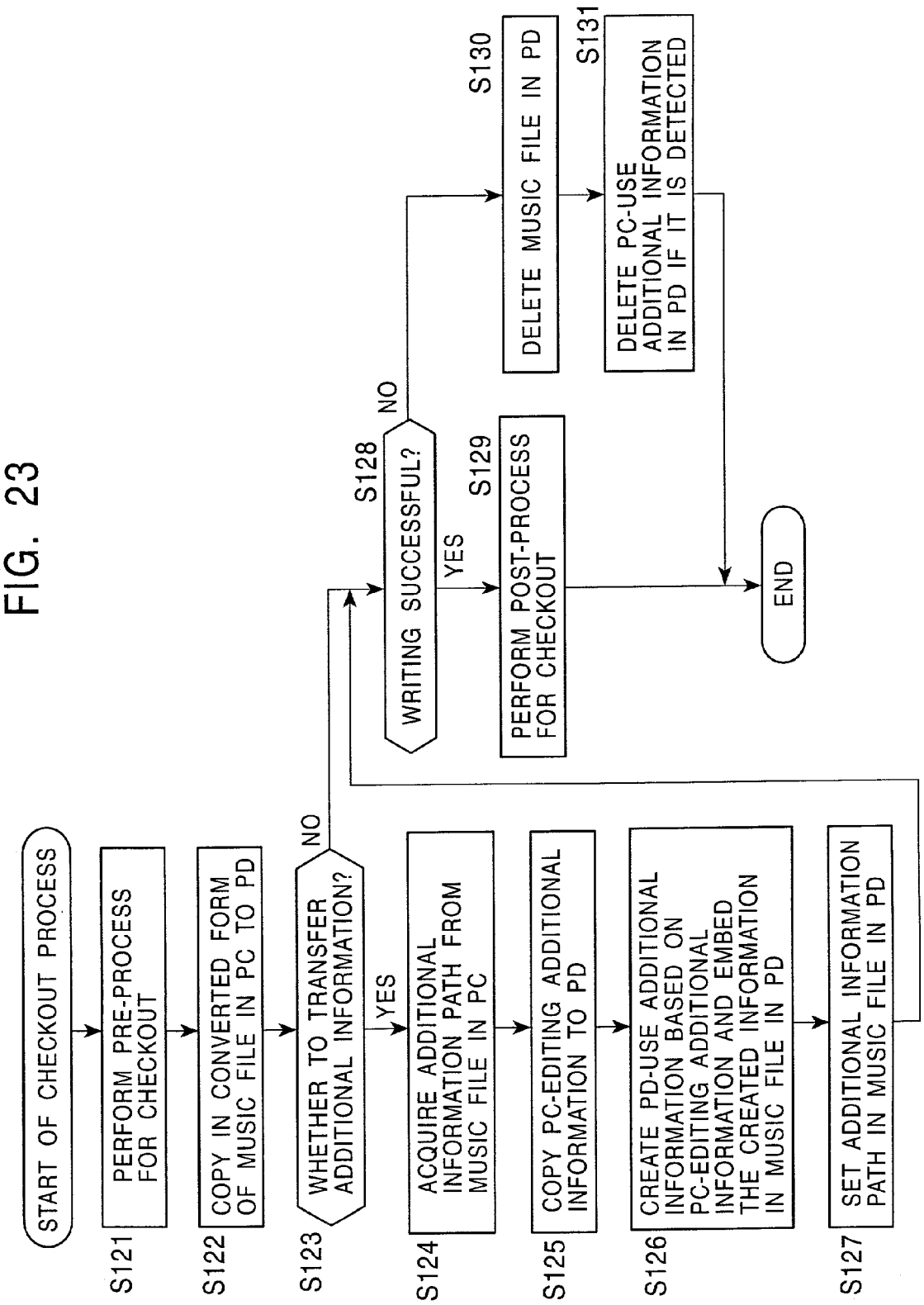
FIG. 23 is a flowchart illustrating a check-out process.

Next, a process for transferring content and additional information in the case of performing check-out of the content from the personal computer 1 to the portable device 5 after setting whether to transfer the additional information is described below with reference to the flowchart shown in FIG. 23.

Figure 21:
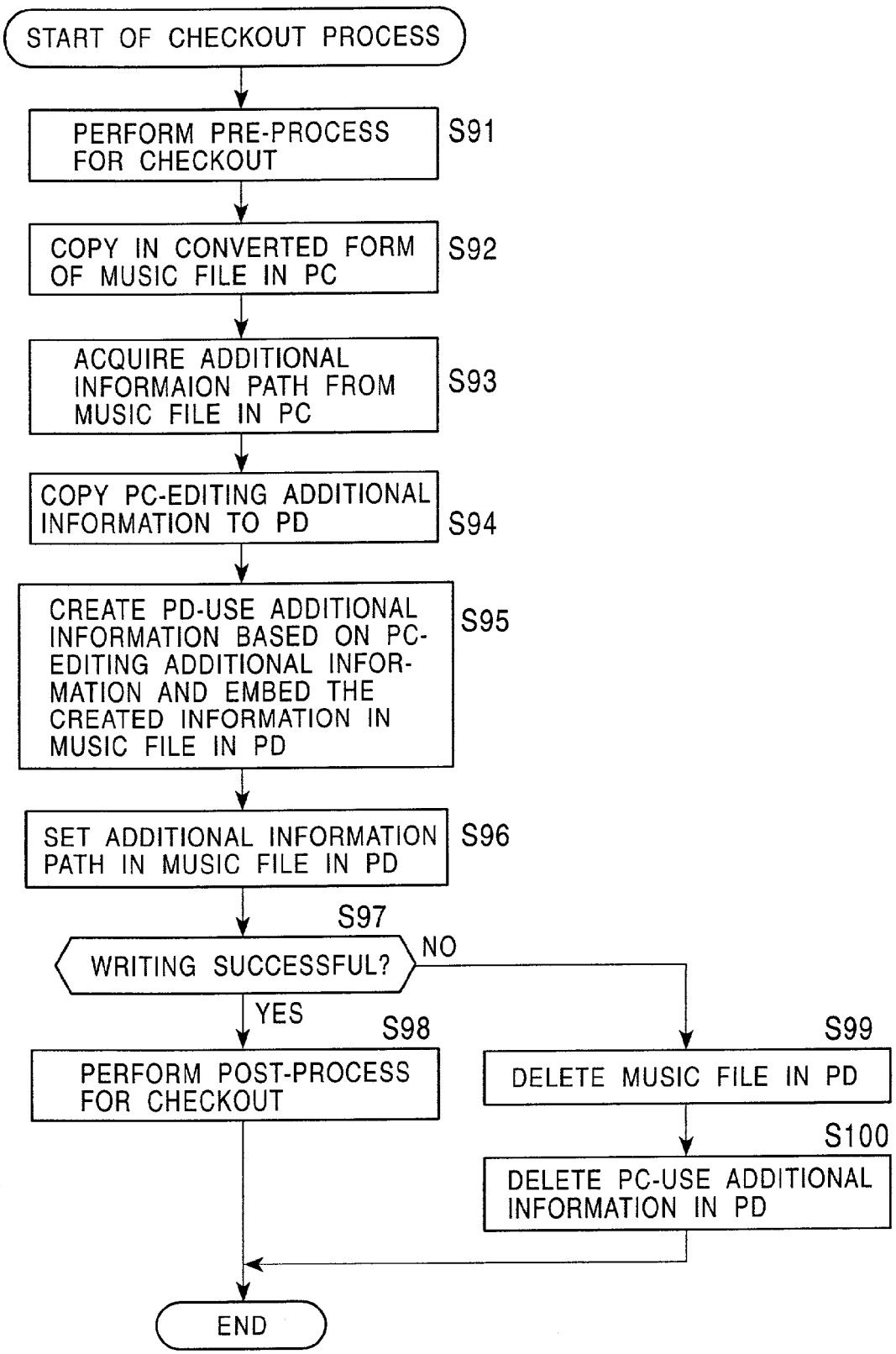
FIG. 21 is a flowchart illustrating a check-out process.

A description of steps S121 and S122 is omitted since they are identical to steps S91 and S92 shown in FIG. 21, respectively.

In step S123, the transport processor 63 determines whether to transfer the additional information, that is, whether the checkbox 161 on the setting screen shown in FIG. 22 has been checked by the user. If the transport processor 63 has determined that the additional information is to be transferred, it proceeds to step S124.

A description of steps S124 to S127 is omitted since they are identical to steps S92 to S96 shown in FIG. 21, respectively.

In step S123, if the transport processor 63 has determined that the additional information is not to be transferred, that is, that the checkbox 161 on the setting screen shown in FIG. 22 has been unchecked, it proceeds to step S128.

A description of steps S128 to S131 is omitted since they are identical to steps S97 to S100 shown in FIG. 21, respectively.

If the transport processor 63 has determined in step S123 that the additional information is not to be transferred, step S125 is skipped over (i.e., the PC-use additional information 77 has not been copied), so that the process ends without performing step S131.

As described above, in the case of performing check-out of content to an external device having no display function, by employing setting for preventing additional information of content from being transferred, the check-out time can be shortened.

Figure 24:
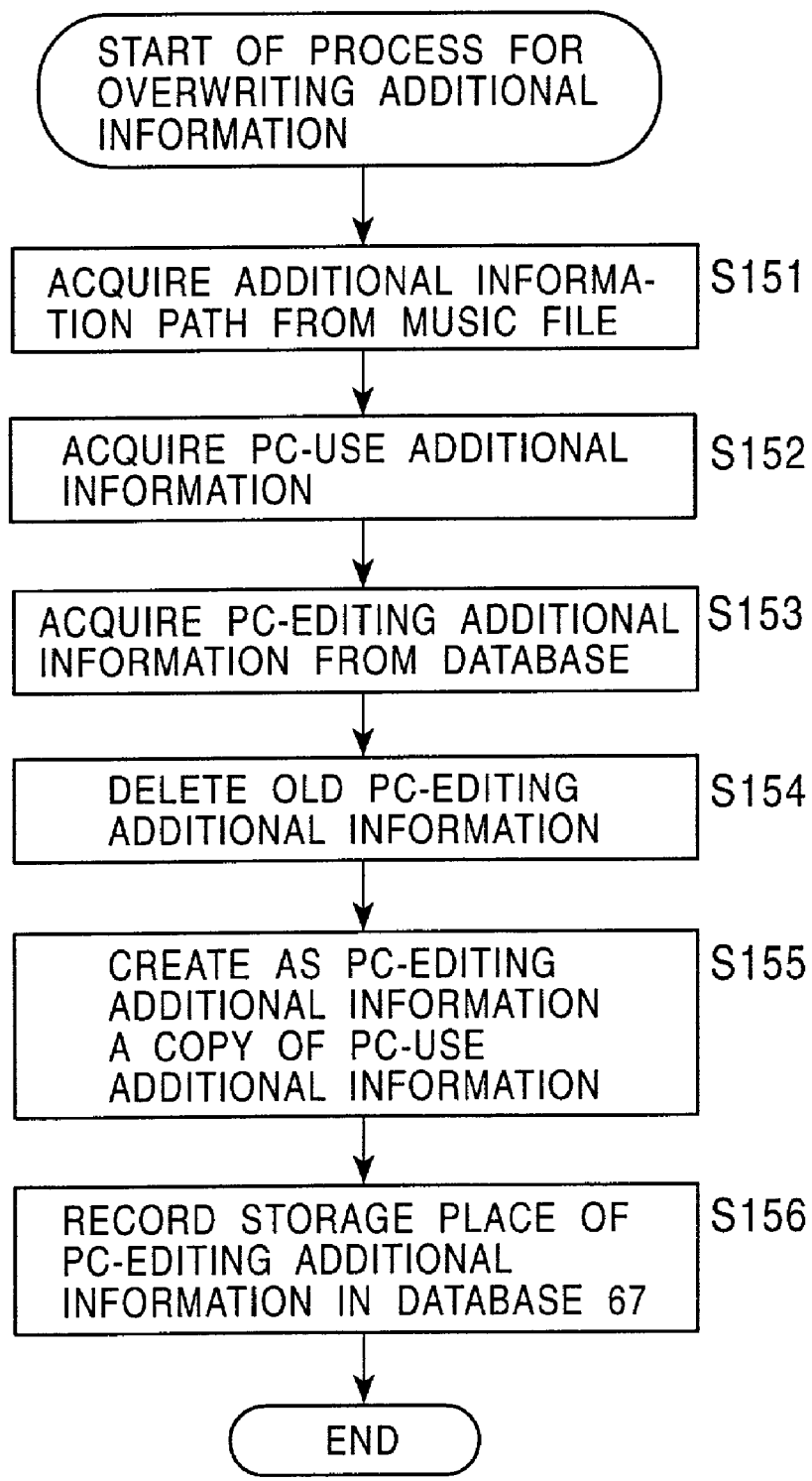
FIG. 24 is a flowchart illustrating an additional information overwriting process.

Next, a process for restoring the original additional information by overwriting the PC-editing additional information by PC-use additional information in a case in which the user has mistakenly erased edited additional information is described below with reference to the flowchart shown in FIG. 24.

If the user has mistakenly erased, for example, edited additional information, by pressing the back button 151 on the property screen shown in FIG. 17, in step S151, the music management unit 64 acquires an additional information path from the music file 69 stored in the music file storage unit 68 of the database 67. Specifically, the music management unit 64 uses the file retrieval unit 66 and the database 67 to acquire an additional information path (the storage place of the PC-use additional information 70) that is included in the music file 69 (e.g., the music file "track.omg" in the directory "Song-A" shown in FIG. 6) recorded in the music file storage unit 68.

In step S152, the music management unit 64 acquires the PC-use additional information 70 (the directory "PKG00001" in the directory "Song-A" in the present case) from the additional information path acquired in step S151. In step S153, the music management unit 64 acquires old PC-editing additional information 71 (the directory "PKG00001-edit" in the directory "Song-A" in the present case) stored in the music file storage unit 68 of the database 67.

In step S154, the music management unit 64 deletes the old PC-editing additional information 71 acquired in step S153. In step S155, the music management unit 64 creates, as new PC-editing additional information 71, a copy of the PC-use additional information 70 acquired in step S152.

In step S155, the music management unit 64 records (stores) the created PC-editing additional information 71 in the music file storage unit 68, and updates the additional information path of the PC-editing additional information 71.

Even if the user has mistakenly erased edited additional information, the original additional information can be easily restored by pressing the BACK button 151 shown in FIG. 17, as described above. This prevents a possibility that the user intentionally or mistakenly edits additional information, and enables the user to operate a jukebox application program at ease.

Also, in the above example, when the content is distributed from the EMD server 3, the PC-use additional information and the PD-used additional information are added to content before the content is distributed. However, the present invention is not limited to the above example.

In other words, when the user downloads, to the portable device 5, the content and additional information distributed from the EMD server 3, links the portable device 5, which has the downloaded content and additional information, to the personal computer 1 in order to perform import (move-in), if the additional information is also downloaded with the content, the number of pieces of content decreases in a portable device 5, which has a storage capacity smaller than that of the HDD 21 of the personal computer 1.

Accordingly, not by distributing the additional information of the content, but by distributing, with the content, information representing the location of additional information such as a URL for accessing the EMD server 3 proving the additional information and a web site in another server, the EMD server 3 can save an amount of data that is stored in the portable device 5.

Figure 25:
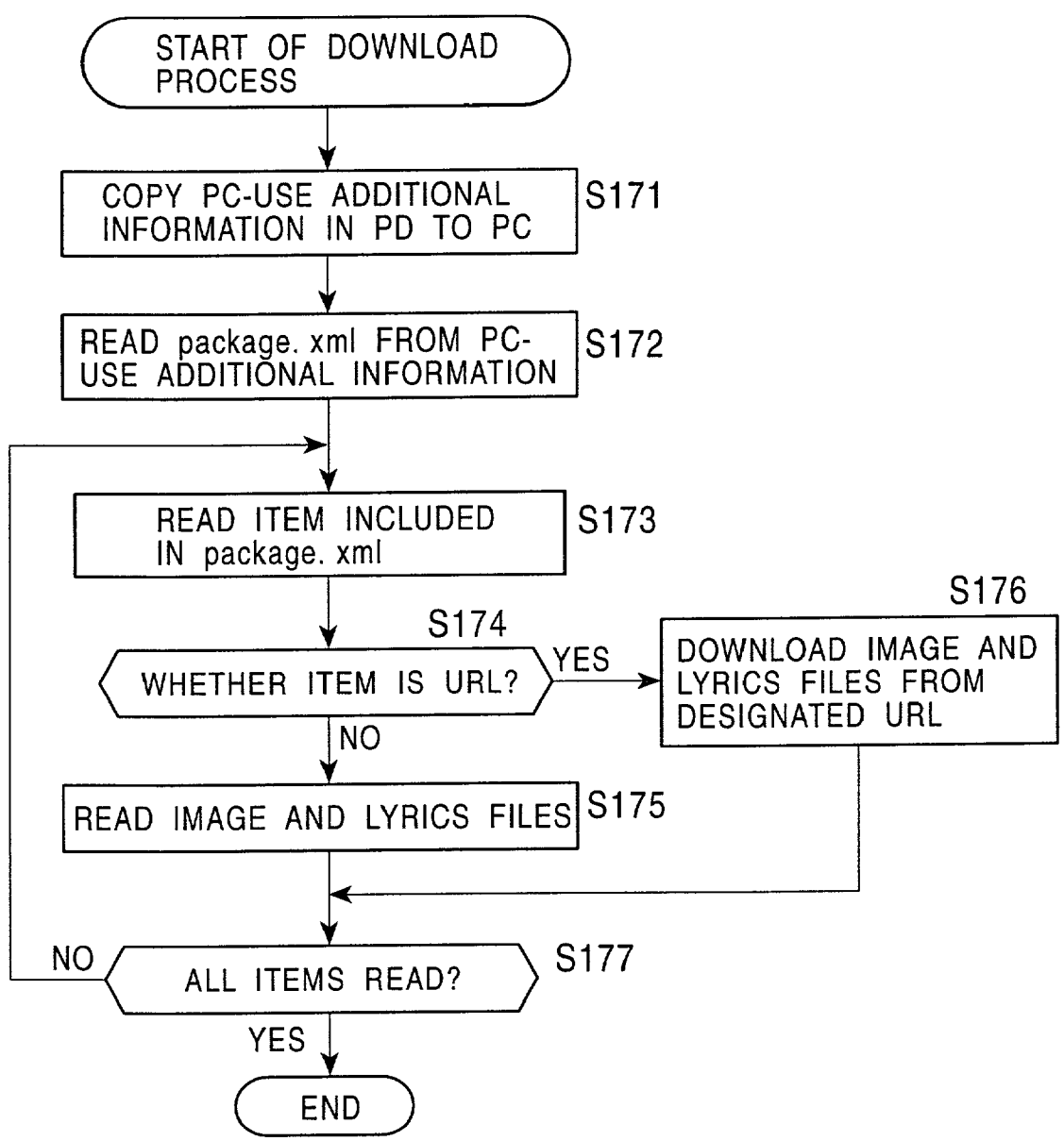
FIG. 25 is a flowchart illustrating a download process.

Next, a process in which the content distributed from the EMD server 3 is downloaded to the portable device 5 and is imported from the portable device 5 to the personal computer 1 is described below with reference to the flowchart shown in FIG. 25.

In the portable device 5, the content distributed from the EMD server 3 is downloaded and recorded. At this time, in the portable device 5, PC-use additional information 77 for accessing a web site providing the additional information is recorded with the content.

When the user performs an operation for performing move-in to the personal computer 1 of the content downloaded to the portable device 5, in step S171, the transport processor 63 creates a copy of the PC-use additional information 77 recorded in the portable device 5 and stores the copy as PC-use additional information 70 in the music file storage unit 68 of the database 67.

In step S172, the transport processor 63 reads the data "package.xml" from the PC-use additional information 70 (e.g., the directory "PKG00001" in the directory "Song-A" shown in FIG. 6) stored in the music file storage unit 68 of the database 67. In step S173, the transport processor 63 reads an item included in the data "package.xml".

In step S174, the transport processor 63 determines whether or not the read item is a URL. If the transport processor 63 has determined that the read item is not a URL, that is, that the read item is an image or lyrics file, it proceeds to step S175, and reads an image or lyrics file.

If the transport processor 63 has determined in step S174 that the read item is an URL, it proceeds to step S176. In step S176, the transport processor 63 activates a web browser, uses the network 2 to link to the EMD server 3 or the like, and displays a web page designated by the URL. By performing by the user a portable device operation on the displayed web page, the image or lyrics file is downloaded.

In step S177, the transport processor 63 determines whether all items have been read. If it has determined that the items have not been read yet, it returns to step S173, and repeatedly performs the above steps. In step S177, if it has determined that the items have already been read, the process ends.

As described above, the EMD server 3 is designed to distribute URL-included PC-use additional information for accessing a web site providing additional information. Thus, the portable device 5, which has a small storage capacity can download more content, and transfer speed increases since the amount of data to be distributed is reduced.

In the case of downloading additional information by using the personal computer 1, in the time of a service in which a telephone charge is constant even if a predetermined number is telephoned all the time from a predetermined time to a predetermined time (e.g., 11:00 p.m. to 8:00 a.m.), the additional information can be acquired by using the personal computer 1 to access the EMD server 3. This enables the user to download pieces of additional information which correspond to pieces of content without paying attention to connection time.

Although the content has been described as music data, it may be a moving picture, a still picture, data such as a numerical value, or a program.

Also, the above-described personal computer 1 imports content from the memory card 9, it may import content not only from the memory card 9, but also from a recording medium such as a magnetic disk, an optical disk, or a magneto-optical disk.

As FIG. 2 shows, recording media in which each program is installed in a computer and is made executable by the computer include the magnetic disk 41 (including a floppy disk), the optical disk 42 (including a CD-ROM and a DVD), the magneto-optical disk 43 (including an MD), and package media composed of the semiconductor memory 44, or include a flash ROM for temporally or eternally storing the program and a hard disk. Recording to the recording media of the program is performed by using a wired or wireless communication medium such as digital satellite broadcasting, and the network 2 including a public circuit network, a local area network, and the Internet through an interface such as a router and a modem as required.

In the present Specification, steps that describe the program recorded on each recording medium include, as a matter of course, time-series processes performed in described order and even processes that are performed in parallel or separately if they are not always performed in time-series manner.

In the present Specification, the system represents the entirety of an apparatus composed of a plurality of apparatuses.

What is claimed is:

1. An information processing apparatus for distributing content, said information processing apparatus comprising:
generating means for generating first additional information in a first file format which can be read by a first electronic device configured to display information stored in the first file format and second additional information in a second file format that is different than the first file format which can be read by a second electronic device, different than the first electronic device, and configured to display information stored in the second file format, the first additional information and the second additional information concerning the content; and
distribution control means for controlling distribution of the first additional information and the second additional information generated by said generating means with the content,
wherein the first additional information in the first file format is information described in a highly extensible format, the second additional information in the second file format is information described in a simple format that can be read and written by the second electronic device which is inferior in processing ability to the first electronic device.

2. A first information processing method for an information processing apparatus for distributing content, said first information processing method comprising:
generating first additional information in a first file format which can be read by a first electronic device configured to display information stored in the first file format and second additional information in a second file format that is different than the first file format which can be read by a second electronic device, different than the first electronic device, and configured to display information stored in the second file format, the first additional information and the second additional information concerning the content; and
controlling distribution of the first additional information and the second additional information generated by said generating with the content,
wherein the first additional information in the first file format is information described in a highly extensible format, the second additional information in the second file format is information described in a simple format that can be read and written by the second electronic device which is inferior in processing ability to the first electronic device.

3. A computer-readable recording medium encoded with instructions, which when executed by a computer causes the computer to implement a method for controlling an information processing apparatus for distributing content, said method comprising:
generating first additional information in a first file format which can be read by a first electronic device configured to display information stored in the first file format and second additional information in a second file format that is different than the first file format which can be read by a second electronic device, different than the first electronic device, and configured to display information stored in the second file format, the first additional information and the second additional information concerning the content; and
controlling distribution of the first additional information and the second additional information generated by said generating with the content,
wherein the first additional information in the first file format is information described in a highly extensible format, the second additional information in the second file format is information described in a simple format that can be read and written by the second electronic device which is inferior in processing ability to the first electronic device.

4. An information processing apparatus comprising:
acquisition means for acquiring content, first additional information on the content in a first file format, and second additional information on the content in a second file format different than the first file format;
recording means for recording the content, the first additional information, and the second additional information which are acquired by said acquisition means in a computer readable storage medium; and transfer control means for controlling, when the content is directed to be transferred by a user's operation to another information processing apparatus, a transfer to the another information processing apparatus of the content, the first additional information, and the second additional information which are recorded by said recording means, wherein one of the first additional information and the second additional information is information described in a highly extensible format which can be read by said information processing apparatus, the other one is information described in a simple format which can be displayed by the another information processing apparatus, and the another information processing apparatus is inferior in processing ability to the information processing apparatus.

5. The information processing apparatus according to claim 4, further comprising display-control means for controlling display of the first additional information recorded in said recording means.

6. A first information processing method comprising:

acquiring content, first additional information on the content in a first file format, and second additional information on the content in a second file format that is different from the first file format;

recording the content, the first additional information, and the second additional information in a computer readable storage medium of a information processing apparatus; and transferring, when the content is directed to be transferred by a user's operation to another information processing apparatus, the content, the first additional information, and the second additional information in which are recorded by said recording, wherein one of the first additional information and the second additional information is information described in a highly extensible format which can be read by said information processing apparatus, the other one is information described in a simple format which can be displayed by the another information processing apparatus, and the another information processing apparatus is inferior in processing ability to the information processing apparatus.

7. A computer-readable recording medium encoded with instructions, which when executed by a computer causes the computer to implement a processing method, said method comprising:

acquiring content, first additional information on the content in a first file format, and second additional information on the content in a second file format that is different from the first file format;

recording the content, the first additional information, and the second additional information in a computer readable storage medium of a information processing apparatus; and transferring, when the content is directed to be transferred by a user's operation to another information processing apparatus, the content, the first additional information, and the second additional information in which were recorded by said recording, wherein one of the first additional information and the second additional information is information described in a highly extensible format which can be read by said information processing apparatus, the other one is information described in a simple format which can be displayed by the another information processing apparatus, and the another information processing apparatus is inferior in processing ability to the information processing apparatus.

8. An information processing system comprising:

a first information processing apparatus for distributing content;

a second information processing apparatus for acquiring the content; and a third information processing apparatus for acquiring the content, wherein said first information processing apparatus comprises:

generating means for generating first additional information in a first file format which can be read by said second information processing apparatus configured to display information stored in the first file format, and second additional information in a second file format that is different than the first file format which can be read by said third information processing apparatus configured to display information stored in the first file format, in which the first additional information and the second additional information concern the content; and distribution-control means for controlling distribution of the first additional information and the second additional information generated by said generating means with the content, wherein the first additional information in the first file format is information described in a highly extensible format, the second additional information in the second file format is information described in a simple format that can be read and written by a second electronic device which is inferior in processing ability to a first electronic device;

said second information processing apparatus comprises:

first acquisition means for acquiring the content, the first additional information, and the second additional information which are distributed from said first information processing apparatus;

first recording means for recording the content, the first additional information, and the second additional information which are acquired by said first acquisition means in a computer readable storage medium; and transfer-control means for controlling, when the content is directed to be transferred by a user's operation to the third information processing apparatus, a transfer to said third information processing apparatus of the content, the first additional information, and the second additional information which are recorded by said first recording means; and said third information processing apparatus comprises:

second acquisition means for acquiring the content, the first additional information, and the second additional information which are transferred from one of the first and second information processing apparatus; and second recording means for recording the content, the first additional information, and the second additional information which are acquired by said second acquisition means in another computer readable storage medium.

9. The information processing system according to claim 8, wherein said second information processing apparatus further comprises display-control means for displaying the first additional information acquired by said first acquisition means.

10. The information processing system according to claim 8, wherein said third information processing apparatus further comprises display-control means for displaying the second additional information acquired by said second acquisition means.

11. An information processing apparatus for distributing content, said information processing apparatus comprising:
a generating unit configured to generate first additional information in a first file format which can be read by a first electronic device configured to display information stored in the first file format and second additional information in a second file format that is different than the first file format which can be read by a second electronic device, different than the first electronic device, and configured to display information stored in the second file format, the first additional information and the second additional information concerning the content; and
a distribution unit configured to control distribution of the first additional information and the second additional information generated by said generating unit with the content,
wherein the first additional information in the first file format is information described in a highly extensible format, the second additional information in the second file format is information described in a simple format that can be read and written by the second electronic device which is inferior in processing ability to the first electronic device.

12. An information processing apparatus comprising:
an acquisition unit configured to acquire content, first additional information on the content in a first file format, and second additional information on the content in a second file format different than the first file format;
a recording unit configured to record the content, the first additional information, and the second additional information which are acquired by said acquisition unit in a computer readable storage medium; and
transfer control unit configured to control, when the content is directed to be transferred by a user's operation to another information processing apparatus, a transfer to the another information processing apparatus of the content, the first additional information, and the second additional information which are recorded by said recording unit,
wherein one of the first additional information and the second additional information is information described in a highly extensible format which can be read by said information processing apparatus, the other one is information described in a simple format which can be displayed by the another information processing apparatus, and the another information processing apparatus is inferior in processing ability to the information processing apparatus.

13. An information processing system comprising:
a first information processing apparatus for distributing content;
a second information processing apparatus for acquiring the content; and
a third information processing apparatus for acquiring the content, wherein said first information processing apparatus comprises:
a generating unit configured to generate first additional information in a first file format which can be read by said second information processing apparatus configured to display information stored in the first file format, and second additional information in a second file format that is different than the first file format which can be read by said third information processing apparatus configured to display information stored in the first file format, in which the first additional information and the second additional information concern the content,
wherein the first additional information in the first file format is information described in a highly extensible format, the second additional information in the second file format is information described in a simple format that can be read and written by a second device which is inferior in processing ability to a first electronic device; and
a distribution-control unit configured to control distribution of the first additional information and the second additional information generated by said generating unit with the content;
said second information processing apparatus comprises:
a first acquisition unit configured to acquire the content, the first additional information, and the second additional information which are distributed from said first information processing apparatus;
a first recording unit configured to record the content, the first additional information, and the second additional information which are acquired by said first acquisition unit in a computer readable storage medium; and
a transfer-control unit configured to control, when the content is directed to be transferred by a user's operation to the third information processing apparatus, a transfer to said third information processing apparatus of the content, the first additional information, and the second additional information which are recorded by said first recording unit; and
said third information processing apparatus comprises:
a second acquisition unit configured to acquire the content, the first additional information, and the second additional information which are transferred from one of the first and second information processing apparatus; and
a second recording unit configured to record the content, the first additional information, and the second additional information which are acquired by said second acquisition unit in another computer readable storage medium.

14. An information processing apparatus for distributing content, said information processing apparatus comprising:
generating means for generating first additional information in a first file format which can be read by a first electronic device configured to display information stored in the first file format and second additional information in a second file format that is different than the first file format which can be read by a second electronic device, different than the first electronic device, and configured to display information stored in the second file format, the first additional information and the second additional information concerning the content; and
distribution control means for controlling distribution of the second additional information and information for accessing a web site providing the first additional information generated by said generating means with the content,
wherein the first additional information in the first file format is information described in a highly extensible format, the second additional information in the second file format is information described in a simple format that can be read and written by the second electronic device which is inferior in processing ability to the first electronic device.

* * * * *